(12) United States Patent
Prange et al.

(10) Patent No.: US 9,488,044 B2
(45) Date of Patent: Nov. 8, 2016

(54) VALUING FUTURE WELL TEST UNDER UNCERTAINTY

(75) Inventors: Michael David Prange, Somerville, MA (US); William John Bailey, Somerville, MA (US)

(73) Assignee: SCHLUMBERGER TECHNOLOGY CORPORATION, Cambridge, MA (US)

( * ) Notice: Subject to any disclaimer, the term of this patent is extended or adjusted under 35 U.S.C. 154(b) by 1082 days.

(21) Appl. No.: 12/456,856

(22) Filed: Jun. 23, 2009

(65) Prior Publication Data
US 2009/0314490 A1   Dec. 24, 2009

Related U.S. Application Data

(63) Continuation-in-part of application No. 12/182,890, filed on Jul. 30, 2008, now Pat. No. 8,073,800.

(60) Provisional application No. 61/074,895, filed on Jun. 23, 2008.

(51) Int. Cl.
  *G06N 5/02* (2006.01)
  *E21B 47/00* (2012.01)

(52) U.S. Cl.
  CPC .............. *E21B 47/00* (2013.01); *G06N 5/02* (2013.01)

(58) Field of Classification Search
  USPC ...................................... 706/62, 45
  See application file for complete search history.

(56) References Cited

U.S. PATENT DOCUMENTS

| | | |
|---|---|---|
| 5,139,094 A | 8/1992 | Prevedel et al. |
| 5,680,906 A | 10/1997 | Andrieux et al. |
| 5,899,958 A | 5/1999 | Dowell et al. |
| 5,992,519 A | 11/1999 | Ramakrishnan et al. |
| 6,266,619 B1 | 7/2001 | Thomas et al. |
| 6,313,837 B1 | 11/2001 | Assa et al. |
| 6,980,940 B1 | 12/2005 | Gurpinar et al. |
| 7,003,439 B2 | 2/2006 | Aldred et al. |
| 7,079,952 B2 | 7/2006 | Thomas et al. |
| 7,248,259 B2 | 7/2007 | Fremming |
| 7,258,175 B2 | 8/2007 | Veeningen et al. |
| 7,478,024 B2 | 1/2009 | Gurpinar et al. |
| 7,523,024 B2 | 4/2009 | Endres et al. |
| 7,539,625 B2 | 5/2009 | Klumpen et al. |
| 7,542,037 B2 | 6/2009 | Fremming |
| 7,546,228 B2 | 6/2009 | Cullick et al. |

(Continued)

FOREIGN PATENT DOCUMENTS

| | | |
|---|---|---|
| GB | 2392931 | 3/2004 |
| GB | 2411669 | 9/2005 |

(Continued)

OTHER PUBLICATIONS

Pinto, et al., Offshore Heavy Oil in Campos Basin: The Petrobras Experience, OTC 15283, Offshore Technology Conference, Houston, Texas, U.S.A., May 5-8, 2003, pp. 1-12.*

(Continued)

*Primary Examiner* — Wilbert L Starks
(74) *Attorney, Agent, or Firm* — Jakub Michna

(57) ABSTRACT

The present invention relates to a method and system for quantifying the value-of-information (VoI) of a proposed and future well test where multiple uncertainties associated with the reservoir properties and/or measurement and/or interpretation may be present.

9 Claims, 13 Drawing Sheets

(56) References Cited

U.S. PATENT DOCUMENTS

| | | |
|---|---|---|
| 7,546,884 B2 | 6/2009 | Veeningen et al. |
| 7,653,563 B2 | 1/2010 | Veeningen et al. |
| 8,073,800 B2 | 12/2011 | Prange et al. |
| 2004/0006502 A1 | 1/2004 | Masiello et al. |
| 2004/0220790 A1 | 11/2004 | Cullick et al. |
| 2005/0209886 A1 | 9/2005 | Corkern |
| 2007/0112547 A1 | 5/2007 | Ghorayeb et al. |

FOREIGN PATENT DOCUMENTS

| | | |
|---|---|---|
| WO | 9964896 | 12/1999 |
| WO | 2004049216 | 6/2004 |

OTHER PUBLICATIONS

Cable, et al., Field Model Predictions to Demonstrate the Value of Integrated Gas Condensate Near-Well SCAL Data, AEA Technology plc, Winfrith Technology Centre, Dorchester, Dorset, DT2 8ZE, UK, Oct. 2, 2002, pp. 1-6.*

Chorn et al, "The value of purchasing information to reduce risk in capital investment projects", SPE 37948, 1997 SPE Hydrocarbon Economics and Evaluation Symposium in Dallas, Texas USA, Mar. 1997, pp. 123-133.

Coopersmith, Ellen, et al., "Making Decisions in the Oil and Gas Industry," Oilfield Review, Winter 2000/2001, pp. 2-9.

Horne, Modern Well Test Analysis: A Computer-Aided Approach, Second Edition, 2.8.2 Fault Boundaries, 1998, p. 33.

Kninx, "Value of information: from coast cutting to value creation", SPE 69839, SPE Asia Pacific Oil and Gas Conference and Exhibition, Brisbane, Australia, Oct. 16-18, 2000, 8 pages.

Prange, M., et al., "Better Valuation of Future Information Under Uncertainty," SPE International, Sep. 24-27, 2006, pp. 1-9, SPE 103028, San Antonio, Texas, USA.

Saputelli, L., et al., "Real-time Decision-making for Value Creation while Drilling," SPE International, Oct. 20-22, 2003, pp. 1-19, SPE/IADC 85314, Abu Dhabi, UAE.

Steagall et al, "How to estimate the value of the information (VOI) of a 4D seismic survey in one offshore giant field", SPE 95876, SPE Annual Technical Conference and Exhibition, Dallas Texas USA, Oct. 9-12, 2005.

Tatang, "An efficient method for parametric uncertainty analysis of numerical geophysical models", Journal of Geophysical Research, 102(D18), 1997.

International Search Report and Written Opinion for related PCT Application Serial No. PCT/US2008/071799, dated Dec. 24, 2008, 16 pages.

GCC Search and Examination Report for related GCC Application Serial No. GCC/P/2008/11431, dated Mar. 15, 2012, 9 pages.

* cited by examiner

VALUING FUTURE WELL TEST UNDER UNCERTAINTY

CROSS REFERENCE TO RELATED APPLICATIONS

This application claims priority under 35 U.S.C. §119 from Provisional patent application 61/074,895 filed Jun. 23, 2008.

This application is a continuation-in-part of the following U.S. patent applications of which this application claims the benefits of priority: application Ser. No. 12/182,890, entitled "Valuing Future Information under Uncertainty" filed on Jul. 30, 2008;

BACKGROUND

Oilfield operations, such as surveying, drilling, wireline testing, completions and production, are typically performed to locate and gather valuable downhole fluids. As shown in FIG. 1A, surveys are often performed using acquisition methodologies, such as seismic scanners to generate maps of underground structures. These structures are often analyzed to determine the presence of subterranean assets, such as valuable fluids or minerals. This information is used to assess the underground structures and locate the formations containing the desired subterranean assets. Data collected from the acquisition methodologies may be evaluated and analyzed to determine whether such valuable items are present, and if they are reasonably accessible.

As shown in FIGS. 1B-1D, one or more wellsites may be positioned along the underground structures to gather valuable fluids from the subterranean reservoirs. The wellsites are provided with tools capable of locating and removing hydrocarbons from the subterranean reservoirs. As shown in FIG. 1B, drilling tools are typically advanced from the oil rigs and into the earth along a given path to locate the valuable downhole fluids. During the drilling operation, the drilling tool may perform downhole measurements to investigate downhole conditions. In some cases, as shown in FIG. 1C, the drilling tool is removed and a wireline tool is deployed into the wellbore to perform additional downhole testing.

After the drilling operation is complete, the well may then be prepared for production. As shown in FIG. 1D, wellbore completions equipment is deployed into the wellbore to complete the well in preparation for the production of fluid therethrough. Fluid is then drawn from downhole reservoirs, into the wellbore and flows to the surface. Production facilities are positioned at surface locations to collect the hydrocarbons from the wellsite(s). Fluid drawn from the subterranean reservoir(s) passes to the production facilities via transport mechanisms, such as tubing. Various equipment may be positioned about the oilfield to monitor oilfield parameters and/or to manipulate the oilfield operations.

During the oilfield operations, data is typically collected for analysis and/or monitoring of the oilfield operations. Such data may include, for example, subterranean formation, equipment, historical and/or other data. Data concerning the subterranean formation is collected using a variety of sources. Such formation data may be static or dynamic. Static data relates to formation structure and geological stratigraphy that defines the geological structure of the subterranean formation. Dynamic data relates to fluids flowing through the geologic structures of the subterranean formation. Such static and/or dynamic data may be collected to learn more about the formations and the valuable assets contained therein.

Sources used to collect static data may be seismic tools, such as a seismic truck that sends compression waves into the earth as shown in FIG. 1A. These waves are measured to characterize changes in the density of the geological structure at different depths. This information may be used to generate basic structural maps of the subterranean formation. Other static measurements may be gathered using core sampling and well logging techniques. Core samples are used to take physical specimens of the formation at various depths as shown in FIG. 1B. Well logging involves deployment of a downhole tool into the wellbore to collect various downhole measurements, such as density, resistivity, etc., at various depths. Such well logging may be performed using, for example, the drilling tool of FIG. 1B and/or the wireline tool of FIG. 1C. Once the well is formed and completed, fluid flows to the surface using production tubing as shown in FIG. 1D. As fluid passes to the surface, various dynamic measurements, such as fluid flow rates, pressure, and composition may be monitored. These parameters may be used to determine various characteristics of the subterranean formation.

Sensors may be positioned throughout the oilfield to collect data relating to various oilfield operations. For example, sensors in the wellbore may monitor fluid composition, sensors located along the flow path may monitor flow rates, and sensors at the processing facility may monitor fluids collected. Other sensors may be provided to monitor downhole, surface, equipment or other conditions. The monitored data is often used to make decisions at various locations of the oilfield at various times. Data collected by these sensors may be further analyzed and processed. Data may be collected and used for current or future operations. When used for future operations at the same or other locations, such data may sometimes be referred to as historical data.

The processed data may be used to predict downhole conditions, and make decisions concerning oilfield operations. Such decisions may involve well planning, well targeting, well completions, operating levels, production rates and other configurations. Often this information is used to determine when to drill new wells, re-complete existing wells, or alter wellbore production.

Data from one or more wellbores may be analyzed to plan or predict various outcomes at a given wellbore. In some cases, the data from neighboring wellbores, or wellbores with similar conditions or equipment is used to predict how a well will perform. There are usually a large number of variables and large quantities of data to consider in analyzing wellbore operations. It is, therefore, often useful to model the behavior of the oilfield operation to determine the desired course of action. During the ongoing operations, the operating conditions may need adjustment as conditions change and new information is received.

Techniques have been developed to model the behavior of geological structures, downhole reservoirs, wellbores, surface facilities, as well as other portions of the oilfield operation. Examples of modeling techniques are shown in patent/application/Publication Nos. U.S. Pat. No. 5,992,519, WO2004049216, WO1999064896, U.S. Pat. No. 6,313,837, US20030216897, US20030132934, US20050149307, and US20060197759. Typically, existing modeling techniques have been used to analyze only specific portions of the oilfield operation. More recently, attempts have been made to use more than one model in analyzing certain oilfield operations. See, for example, Patent/Publication Nos. U.S. Pat. No. 6,980,940, WO2004049216, US20040220846, and US 2007-0112547.

Techniques have also been developed to predict and/or plan certain oilfield operations, such as drilling operations. Examples of techniques for generating drilling plans are provided in Publication Nos. US20050236184, US20050211468, US20050228905, US20050209886, and US20050209836. Some drilling techniques involve controlling the drilling operation. Examples of such drilling techniques are shown in Patent Application Nos. GB2392931 and GB2411669. Other drilling techniques seek to provide real-time drilling operations. Examples of techniques purporting to provide real-time drilling are described in U.S. Pat. No. 7,079,952, U.S. Pat. No. 6,266,619, U.S. Pat. No. 5,899,958, U.S. Pat. No. 5,139,094, U.S. Pat. No. 7,003,439, and U.S. Pat. No. 5,680,906.

Despite the development and advancement of modeling techniques in oilfield operations, there is a need to consider the effects of unavailable information and/or uncertain information and/or uncertainty in oilfield parameters on oilfield operations. It is desirable to provide techniques to assess the value of acquiring missing information, and/or assess the value of reducing the uncertainty in information and/or assess the value of reducing the uncertainty in oilfield parameters for decision making support. U.S. application Ser. No. 12/182,890, published under WO2009/018462 shows how this value assessment of the acquired information may change the characteristics of the oilfield operation and propose to selectively consider desired parameters, such as the probable contents of the missing information to be acquired, uncertainty in the acquired information, market uncertainty, private uncertainty, etc. U.S. application Ser. No. 12/182,890 further describes techniques that may be capable of one or more of the following, among others: considering the effect of multivariate, and/or time dependent, and/or continuously distributed, and/or discretely distributed uncertainties, valuing the missing information to be acquired in the future, and providing modeling capability to speed up the value assessment process without jeopardizing the quality of the results.

It now however remains a need for establishing meaningful value-of-information (VoI) metrics for a well test when faced with multiple significant uncertainties. Actually, when faced with multiple critical uncertainties associated with the reservoir and measurement/interpretation, a standard decision tree would become far too cumbersome for practical purposes and may even result in sub-optimal (uneconomic) development decisions from being made because of the discretized nature of the existing decision tree constructs. It therefore remains a need for providing a consistent and functional methodology that can compute meaningful VoI for a well test such that all significant uncertainties are considered.

It is further desirable to consider uncertainty in the well test measurement and/or the interpretation itself. Precisely, it is desirable to provide a means to best establish the optimum well test duration by identifying the time at which maximum marginal VoI from the test is found.

SUMMARY

In general, in some aspect, the invention relates to a method and system for quantifying the value-of-information (VoI) of a proposed and future well test where multiple uncertainties associated with the reservoir properties and/or measurement and/or interpretation may be present.

Advantageously, one embodiment of the invention presents a method a performing an oilfield operation within an oilfield comprising:

a. inputting in a computer system at least two possible options to perform the oilfield operation;

b. inputting in the computer system a first variable related to the oilfield; said first variable being able to fall within a first range of discrete values;

c. inputting in the computer system a second variable related to the oilfield; said second variable being able to fall within a second range of discrete values;

d. generating with the computer system a decision tree comprising an uncertainty node for each one of the at least two possible options to perform the oilfield operation, wherein the uncertainty node is linked to a probability density function for at least one of the first or second variable;

e. generating with the computer system a figure of merit for each of the uncertainty node;

f. performing the oilfield operation by selecting one of the two possible options based on the value of their respective figure of merit.

Advantageously, the probability density function comprises uncertainties associated with the first or the second variable.

Advantageously, another embodiment further comprises g. inputting in the computer system a specific range of discrete values for the first variable, said specific range of discrete values being included in within the first range of discrete values;

h. generating with the computer system an additional uncertainty node for the specific range of discrete values;

i. generating with the computer system an additional figure of merit for the additional uncertainty node;

j. inputting the value of the additional figure of merit in the decision tree.

Advantageously, the figure of merit is evaluated by modeling the oilfield operation using at least one selected from a group consisting of reservoir simulator, wellbore simulator, surface network simulator, process simulator, hydrocarbon charge simulator and economics simulator.

Advantageously, the probability density function is evaluated using sampling methods.

Another embodiment of the invention provides a method of determining an optimum well test duration for an oilfield having at least one process facility and at least one wellsite operatively connected thereto, each at least one wellsite having a wellbore penetrating a subterranean formation for extracting fluid from an underground reservoir therein, the method comprising:

assessing the accuracy of the well test as a function of well test duration;

quantifying a value-of-information of the well test while accounting for uncertainties associated with the wellbore and/or underground reservoir and/or measurements performed within the wellbore and/or interpretation of the measurements;

estimating a well test cost as a function of the well test duration; and determining the optimum well test duration by combining the accuracy of the well test, the value-of-information and the well test cost to determine the time at which maximum marginal value-of-information from the test is achieved.

Another embodiment of the invention provides a method of optimizing well-test operations for an oilfield having at least one process facility and at least one wellsite operatively connected thereto, each at least one wellsite having a wellbore penetrating a subterranean formation for extracting fluid from an underground reservoir therein, the method comprising:

computing value-of-information of the well test while accounting for uncertainties or risk aversion associated with the wellsite or wellbore or reservoir metrics;

optimizing the well test operation from the computed value-of-information of the well test.

DETAILED DESCRIPTION

Figure 1A:
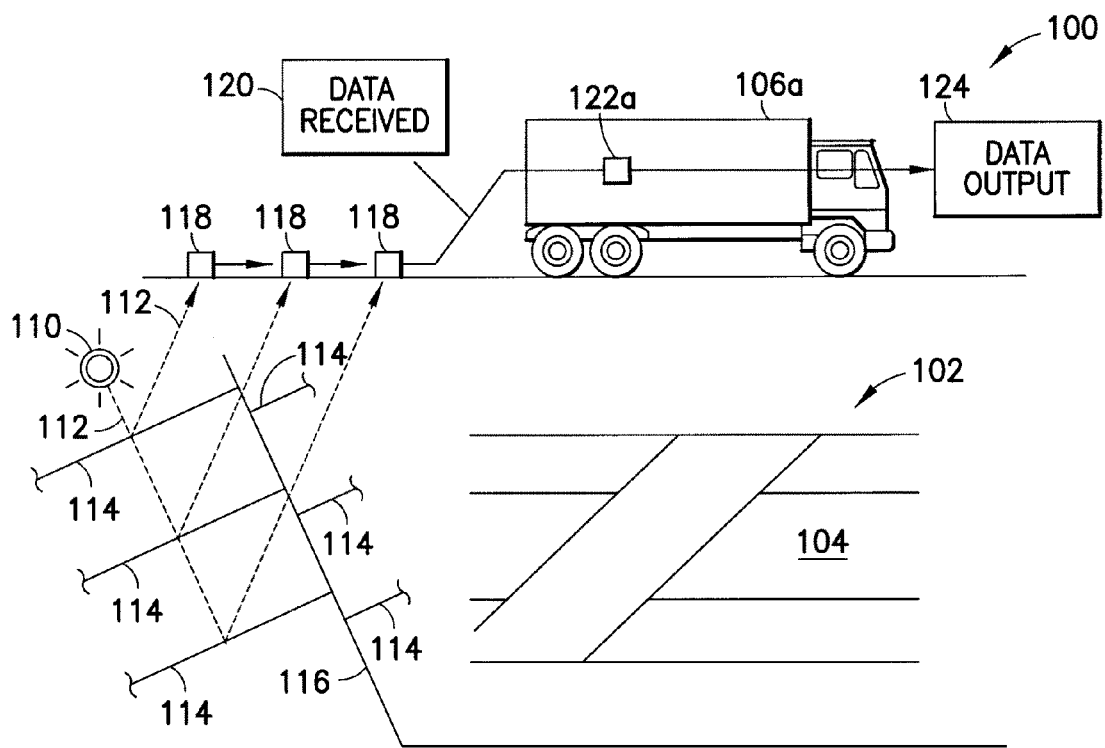
FIGS. 1A-1D depict a schematic view of an oilfield having subterranean structures including reservoirs therein, various oilfield operations being performed on the oilfield.

Exemplary embodiments of the invention will now be described in detail with reference to the accompanying figures. Like items in the figures are denoted with like reference numerals for consistency.

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIGS. 1A-D show an oilfield (100) having geological structures and/or subterranean formations therein. As shown in these figures, various measurements of the subterranean formation are taken by different tools at the same location. These measurements may be used to generate information about the formation and/or the geological structures and/or fluids contained therein. As shown in FIGS. 1A-1D, the oilfield (100) may be in different phases of the oilfield operations and may or may not include any oil well. In addition, the geological structures and/or subterranean formations of the oilfield (100) may contain hydrocarbons such as oil, gas, and condensate.

FIGS. 1A-1D depict schematic views of an oilfield (100) having subterranean formations (102) containing a reservoir (104) therein and depicting various oilfield operations being performed on the oilfield (100). FIG. 1A depicts a survey operation being performed by a seismic truck (106a) to measure properties of the subterranean formation. The survey operation is a seismic survey operation for producing sound vibrations. In FIG. 1A, one such sound vibration (112) is generated by a source (110) and reflects off a plurality of horizons (114) in an earth formation (116). The sound vibration(s) (112) is (are) received by sensors, such as geophone-receivers (118), situated on the earth's surface, and the geophone-receivers (118) produce electrical output signals, referred to as data received (120) in FIG. 1A.

The data received (120) is provided as input data to a computer (122a) of the seismic recording truck (106a), and responsive to the input data, the recording truck computer (122a) generates a seismic data output record (124). The seismic data may be further processed as desired, for example by data reduction.

Figure 1B:
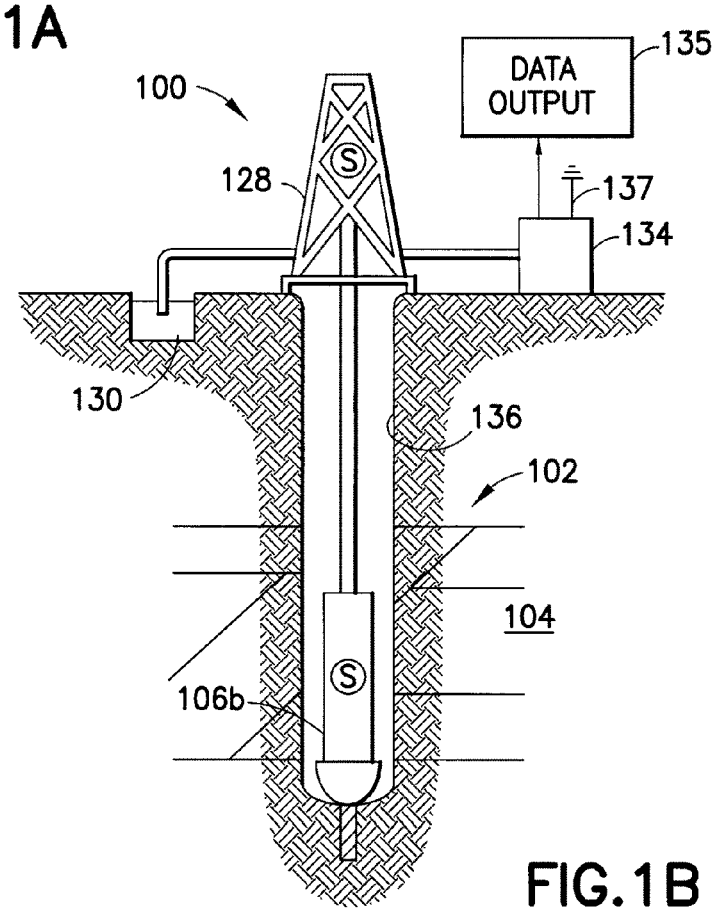

FIG. 1B depicts a drilling operation being performed by a drilling tool (106b) suspended by a rig (128) and advanced into the subterranean formation (102) to form a wellbore (136). A mud pit (130) is used to draw drilling mud into the drilling tool (106b) via a flow line (132) for circulating drilling mud through the drilling tool (106b) and back to the surface. The drilling tool (106b) is advanced into the formation to reach a reservoir (104). The drilling tool (106b) is preferably adapted for measuring downhole properties. The drilling tool (106b) may also be adapted for taking a core sample (not shown), or removed so that a core sample (not shown) may be taken using another tool.

A surface unit (134) is used to communicate with the drilling tool (106b) and offsite operations. The surface unit (134) is capable of communicating with the drilling tool (106b) to send commands to drive the drilling tool (106b), and to receive data therefrom. The surface unit (134) is preferably provided with computer facilities for receiving, storing, processing, and analyzing data from the oilfield (100). The surface unit (134) collects data output (135) generated during the drilling operation. Computer facilities, such as those of the surface unit (134), may be positioned at various locations about the oilfield (100) and/or at remote locations.

Sensors (S), such as gauges, may be positioned throughout the reservoir, rig, oilfield equipment (such as the downhole tool), or other portions of the oilfield for gathering information about various parameters, such as surface parameters, downhole parameters, and/or operating conditions. These sensors preferably measure oilfield parameters, such as weight on bit, torque on bit, pressures, temperatures, flow rates, flowing phase fractions, choke, and valve settings, compositions and other parameters of the oilfield operation.

The information gathered by the sensors may be collected by the surface unit (134) and/or other data collection devices for analysis or other processing. The data may be used alone or in combination with other data. The data may be collected in a database and all or select portions of the data may be selectively used for analyzing and/or predicting oilfield operations of the current and/or other wellbores.

Data outputs from the various sensors positioned about the oilfield may be processed for use. The data may be historical data, real time data, or combinations thereof. The real time data may be used in real time, or stored for later use. The data may also be combined with historical data or other inputs for further analysis. The data may be housed in separate databases, or combined into a single database.

The collected data may be used to perform analysis, such as modeling operations. For example, the seismic data output may be used to enable geological, geophysical, reservoir engineering, and/or production simulations. The reservoir, wellbore, surface and/or process data may be used to perform reservoir, wellbore, or other production simulations. The data outputs from the oilfield operation may be generated directly from the sensors, or after some preprocessing or modeling. These data outputs may act as inputs for further analysis.

The data is collected and may be stored at the surface unit (134). One or more surface units (134) may be located at the oilfield (100), or linked remotely thereto. The surface unit (134) may be a single unit, or a complex network of units used to perform the necessary data management functions throughout the oilfield (100). The surface unit (134) may be a manual or automatic system. The surface unit (134) may be operated and/or adjusted by a user.

The surface unit (134) may be provided with a transceiver (137) to allow communications between the surface unit (134) and various portions of the oilfield (100) or other locations. The surface unit (134) may also be provided with or functionally linked to a controller for actuating mechanisms at the oilfield. The surface unit (134) may then send command signals to the oilfield (100) in response to data received. The surface unit (134) may receive commands via the transceiver or may itself execute commands to the controller. A processor may be provided to analyze the data (locally or remotely) and make the decisions to actuate the controller. In this manner, the oilfield (100) may be selectively adjusted based on the data collected to optimize fluid recovery rates, or to maximize the longevity of the reservoir and its ultimate production capacity. These adjustments may be made automatically based on computer protocol, or manually by an operator. In some cases, well plans may be adjusted to select optimum operating conditions, or to avoid problems.

Figure 1C:
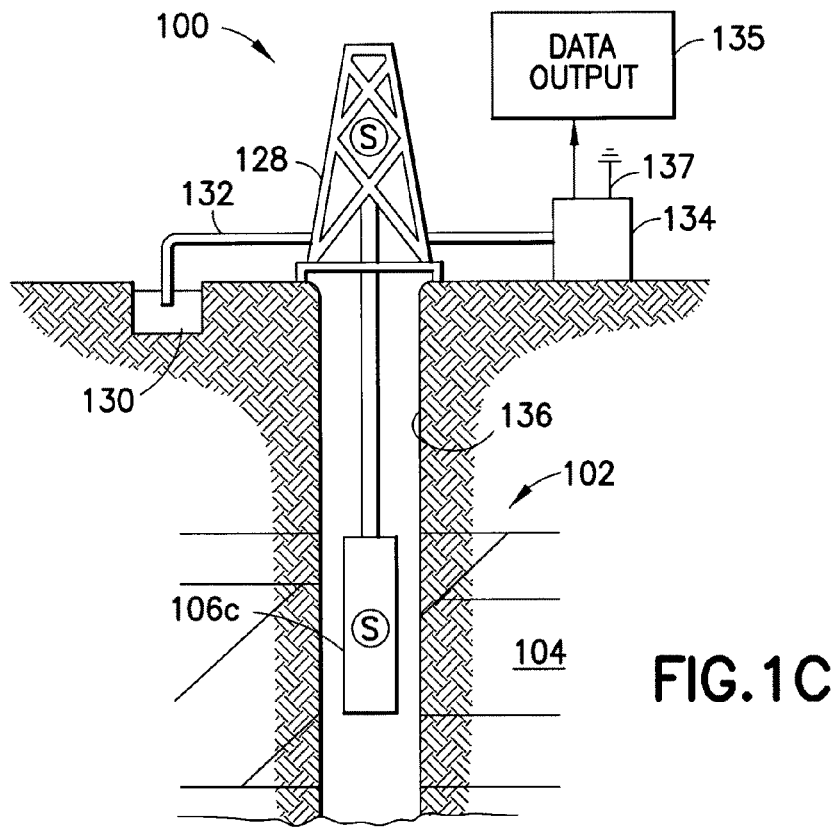

FIG. 1C depicts a wireline operation being performed by a wireline tool (106c) suspended by the rig (128) and into the wellbore (136) of FIG. 1B.

The wireline tool (106c) is preferably adapted for deployment into a wellbore (136) for performing well logs, performing downhole tests and/or collecting samples. The wireline tool (106c) may be used to provide another method and apparatus for performing a seismic survey operation. The wireline tool (106c) of FIG. 1C may have an explosive or acoustic energy source (144) that provides signals to the surrounding subterranean formations (102).

The wireline tool (106c) may be operatively linked to, for example, the geophone (118) data which is stored in the computer (122a) of the seismic recording truck (106a) of FIG. 1A. The wireline tool (106c) may also provide data to the surface unit (134). As shown data output (135) is generated by the wireline tool (106c) and collected at the surface. The wireline tool (106c) may be positioned at various depths in the wellbore (136) to provide a survey of the subterranean formation.

Figure 1D:
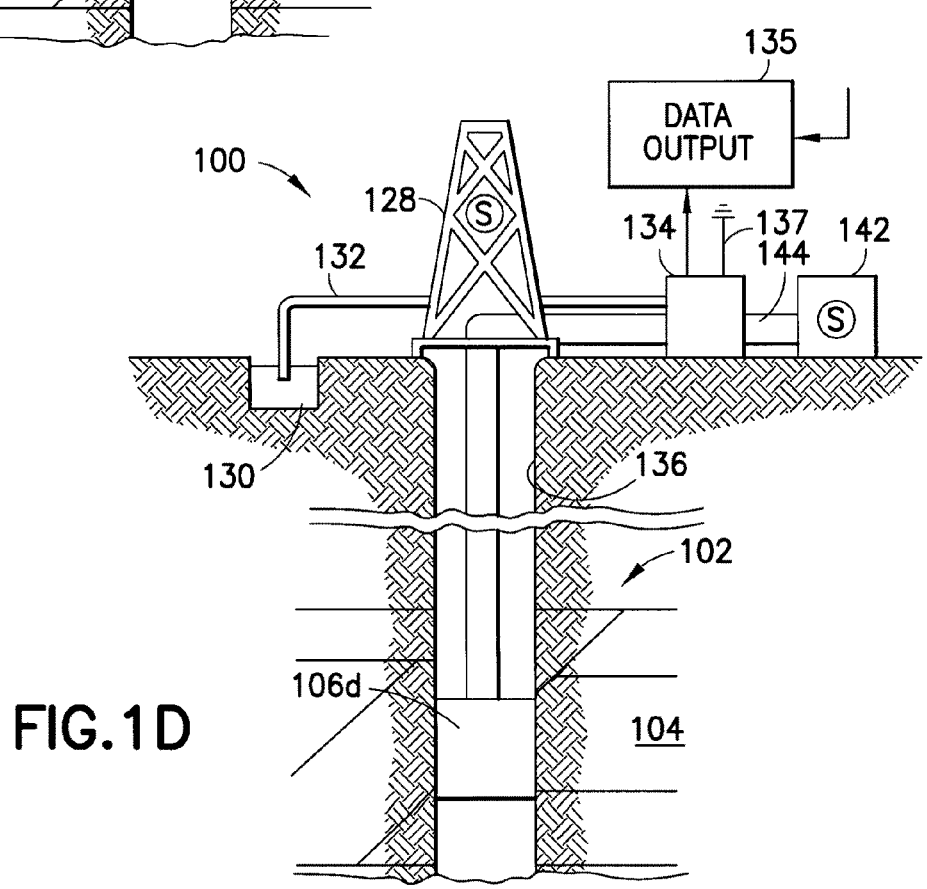

FIG. 1D depicts a production operation being performed by production equipment (106d) deployed from a production unit and into the completed wellbore (136) of FIG. 1C for drawing fluid from the downhole reservoirs into the surface facilities (142). Fluid flows from reservoir (104) through perforations in the casing (not shown) and into the production equipment (106d) in the wellbore (136) and to the surface facilities (142) via a gathering network (144).

Sensors, such as gauges, may be positioned about the oilfield to collect data relating to various oilfield operations as described previously. As shown, the sensors may be positioned in the production equipment (106d) or other associated equipment, such as a Christmas tree, gathering network (144), surface facilities (142) and/or the production facility, to measure fluid parameters, such as fluid composition, flow rates, pressures, temperatures, and/or other parameters of the production operation.

While only simplified wellsite configurations are shown, it will be appreciated that the oilfield may cover a portion of land and/or water locations (e.g., sea) that hosts any number of wellsites. Production may also include injection wells (not shown) for added recovery. Any number of gathering facilities may be operatively connected to any number of the wellsites for selectively collecting downhole fluids from the wellsite(s).

While FIGS. 1A-1D depict tools used to measure properties of an oilfield (100), it will be appreciated that the tools may be used in connection with non-oilfield operations, such as mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation (102) and/or its geological formations may be used. Various sensors may be located at various positions along the wellbore and/or the oilfield tools to gather and/or monitor the desired data. Other sources of data may also be provided from offsite locations.

The oilfield configuration in FIGS. 1A-1D are intended to provide a brief description of an example of an oilfield usable with the present invention. Part, or all, of the oilfield (100) may be on land and/or water locations (e.g., sea). Also, while a single oilfield measured at a single location is depicted, the present invention may be used with any number of oilfields (100), processing facilities, and wellsites.

Figure 2:
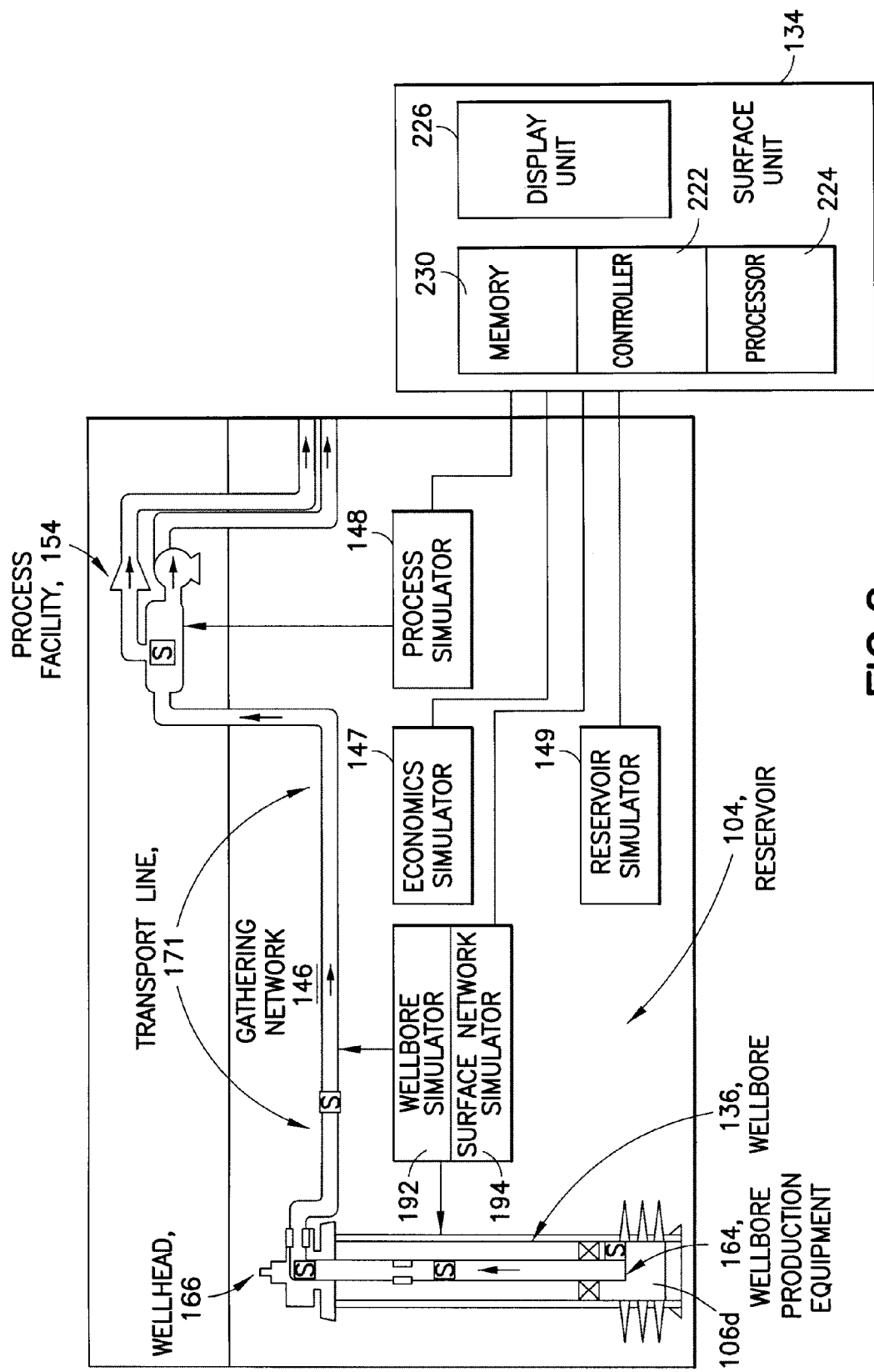
FIG. 2 shows a schematic view of a portion of the oilfield of FIGS. 1A-1D, depicting the wellsite and gathering network in detail.

FIG. 2 shows a schematic view of a portion of the oilfield (100) of FIGS. 1A-1D, depicting the wellsite and gathering network (146) in detail. The wellsite of FIG. 2 has a wellbore (136) extending into the earth therebelow. As shown, the wellbore (136) has already been drilled, completed, and prepared for production from reservoir (104). Wellbore production equipment (106d) extends from a wellhead (166) of wellsite and to the reservoir (104) to draw fluid to the surface. The wellsite is operatively connected to the gathering network (146) via a transport line (171). Fluid flows from the reservoir (104), through the wellbore (136), and onto the gathering network (146). The fluid then flows from the gathering network (146) to process facilities (154).

As further shown in FIG. 2, sensors (S) are located about the oilfield to monitor various parameters during oilfield operations. The sensors (S) may measure, for example, pressure, temperature, flow rate, composition, and other parameters of the reservoir, wellbore, gathering network, process facilities and other portions of the oilfield operation. These sensors (S) are operatively connected to the surface unit (134) for collecting data therefrom.

One or more surface units (e.g., surface unit (134)) may be located at the oilfield, or linked remotely thereto. As shown on FIG. 2, the surface unit (134) is adapted to receive and store data. The surface unit (134) may also be equipped to communicate with various oilfield equipment. The surface unit (134) may then send command signals to the oilfield in response to data received.

The surface unit (134) has computer facilities, such as memory (230), controller (222), processor (224), and display unit (226), for managing the data. The data is collected in memory (230), and processed by the processor (224) for analysis. Data may be collected from the oilfield sensors (S) and/or by other sources. For example, oilfield data may be supplemented by historical data collected from other operations, or user inputs.

The analyzed data may then be used to make decisions. A transceiver (not shown) may be provided to allow communications between the surface unit (134) and the oilfield. The controller (222) may be used to actuate mechanisms at the oilfield via the transceiver and based on these decisions. In this manner, the oilfield may be selectively adjusted based on the data collected. These adjustments may be made automatically based on computer protocol and/or manually by an operator. In some cases, well plans are adjusted to select optimum operating conditions, or to avoid problems.

To facilitate the processing and analysis of data, simulators are typically used by the processor to process the data. Specific simulators are often used in connection with specific oilfield operations, such as reservoir or wellbore production. Data fed into the simulator(s) may be historical data, real time data, or combinations thereof. Simulation through one or more of the simulators may be repeated or adjusted based on the data received.

The oilfield operation is provided with wellsite and non-wellsite simulators. The wellsite simulators may include a reservoir simulator (149), a wellbore simulator (192), and a surface network simulator (194). The reservoir simulator solves for petroleum flow through the reservoir rock and into the wellbores. The wellbore simulator and surface network simulator solves for petroleum flow through the wellbore and the surface gathering network (146) of pipelines. Some of the simulators may be separate or combined, depending on the available systems.

The non-wellsite simulators may include process and economics simulators. The processing unit might have a process simulator (148). The process simulator (148) models the processing plant (e.g., the process facility (154)) where the petroleum is separated into its constituent components (e.g., methane, ethane, propane, etc.) and prepared for sales. The oilfield might be provided with an economics simulator (147). The economics simulator (147) models the costs of part or all of the oilfield. Various combinations of these and other oilfield simulators may be provided.

Figure 3:
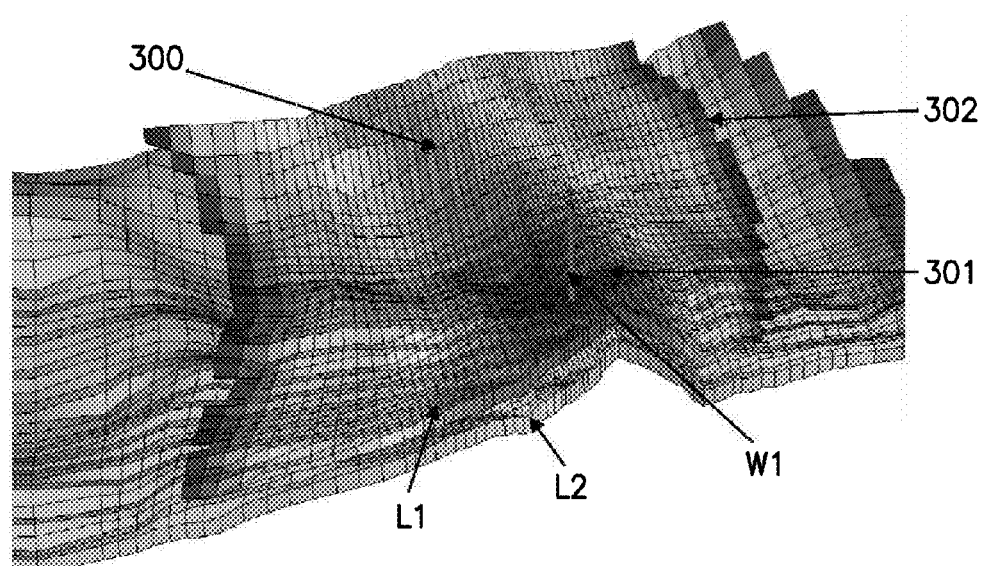
FIG. 3 shows a perspective representation of a field looking approximately northwards.

FIG. 3 shows a perspective view (looking north) of a small shallow-water oil field, located in roughly 120 ft of water, as it was identified from reinterpretation of seismic data. The field lies some 14,200 ft below sea-level and contains oil with some dissolved gas. The field has two primary producing layers, which are separated by a thick, field-wide, homogeneous impermeable shale layer (80 ft thick on average). FIG. 3 also shows both layers and the location of an exploratory test well (W1). The field is thought to have been formed from a small north-south (N-S) flowing river tributary which is visible (300). Highest porosity is located at the center of the river channel (dark center 301), gradually degrading in quality up its banks (shown in black 302).

It has been assumed for this example that the nearest production platform is located about 5-km away and is currently on decline. Consequently it has sufficient excess capacity for production and injection support (if required). The exploratory well was drilled near to the crest of the gently anticlinal structure and logging confirmed the presence of oil. Fluid samples were taken.

There is a real likelihood that this structure could be faulted, resulting in compartmentalization and reduced recoverable volumes, possibly by a significant amount. This concern is justified from experience with nearby analogues, several having sealing faults resulting in compartments—sometimes severely. There is no indication that an aquifer is present, indicating that some form of pressure support may be necessary.

Based on this limited information, and the generally marginal nature of the field, the following general development alternatives can be proposed:

a. Option ProdS: Convert the existing well (W1) into a producer (renamed ProdS) and tieback through a sub-sea line to the platform 5 km away.

b. Option ProdS+Inj: Drill a water injector (Inj) convert existing well (W1) into a producer (renamed prodS) and tie-back both wells to the platform 5 km away.

c. Option Abandon: The asset is abandoned without any development. Regulations require that well (W1) to be plugged, well head removed and all debris cleared.

While compartmentalization is a possibility, its magnitude is not known. The aforementioned analogues provide no reliable basis for inferring the likely extent of any associated compartments and their impact on recoverable Stock Tank of Oil Initially In Place (STOIIP). It is therefore rightly unsure how best to exploit this asset, if it is to be exploited at all. One approach to address this uncertainty is to run a well test to establish the location of the no-flow boundaries. This will help the oilfield management team determine the most likely recoverable STOIIP and also the most economically efficient development option. However, since this is a marginal field, the cost of the well test can only be justified if it contributes information that will significantly increase the expected value of future recovery from the field over the expected value without the well test. This difference is called the expected value-of-information (EVoI) of the well test. It is an object of an embodiment of the invention to efficiently compute this EVoI for a well test on a field with uncertain porosity, permeability and compartmentalization. In a further embodiment of the invention, it is sought for how this value varies with well test interpretation reliability.

Based on the FIG. 3, a small reservoir model was constructed (using for example 8892-cell ECLIPSE® model from Schlumberger Information Solutions) to assist asset management in development plan evaluation and decision making. The model has two primary producing layers, L1 and L2, separated by the laterally extensive impermeable shale layer mentioned earlier. The model has 76 cells in the i-direction and 39 cells in the j-direction. Reservoir fluids are defined by a simple black oil model (as is provided by ECLIPSE®), derived from the fluid samples, and applied throughout the field wherein shades of grey represent the porosity of the formation. The oil-water contact was identified to be at 14,579 ft. In the model, the well W1 is located at i-j grid co-ordinates {44,9} and is completed in both producing layers, L1 and L2. Note that the (i,j) grid origin starts at the bottom left, instead of the top left as is normally the case. Table 1 below presents the basic reservoir properties associated with the model:

| Property (units) | Field | L1 | L2 |
|---|---|---|---|
| Porosity | 15.6% | 16.1% | 14.3% |
| Horizontal Permeability (mD) | 246.5 | 283.6 | 153.2 |
| Vertical Permeability (mD) | 24.6 | 28.3 | 15.3 |

-continued

| Property (units) | Field | L1 | L2 |
|---|---|---|---|
| Average Thickness (ft) | 79.7 | 76.0 | 89.1 |
| Average Pressure (psia) | 11276.4 | 11249.7 | 11343.6 |
| Gas Solubility (Mscf/bbl) | 1.516 | | |
| Bubble Point Pressure (psia) | 3939.7 | | |
| Oil Density (lbs/ft$_3$) | 50.691 | | |
| Brine Density (lbs/ft$_3$) | 67.050 | | |
| Critical Water Saturation | 8.0% | | |

This table applies to the whole field and does not vary by layer, and hence no layer-specific values are stated. Average reservoir property values are shown for the field and both primary producing layers, L1 and L2.

Uncertainty in permeability and porosity was modeled with a permeability multiplier, k, and a porosity multiplier, φ, that operated on the entire model grid. The uncertainty in these multipliers is described by the following multi-normal distribution:

$$\begin{bmatrix} \log k \\ \phi \end{bmatrix} = N\left(\begin{bmatrix} 0 \\ 1 \end{bmatrix}, \begin{bmatrix} 0.090 & 0.024 \\ 0.024 & 0.010 \end{bmatrix}\right). \quad (1)$$

Figure 4:
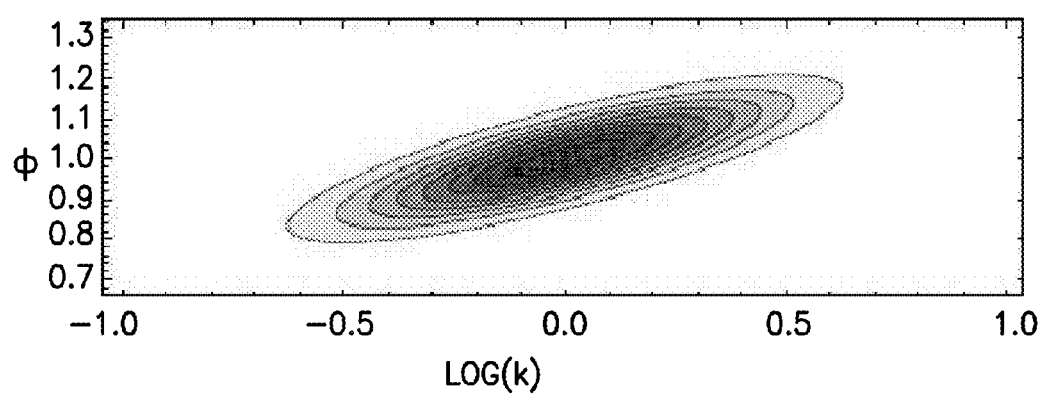
FIG. 4 shows a probability density function for uncertainty in the permeability and porosity multipliers k and $\phi$.

The joint probability density function for this uncertainty is plotted in FIG. 4. To enable rapid solution, it was decided that any reservoir volume located outside the compartment delineated by the faults is made inactive (achieved through zero pore volume multipliers). The j-location of any proposed vertical injector (Inj) is dependent upon the j location of the east-west (E-W) orientated fault, denoted by h, but with a fixed offset of 2 grid cells, e.g., if the east-west fault is located at h=22, then the injector would be j=20. The east-west position of the injector is fixed at i=44, the ilocation of W1. This avoids possible initialization errors of the reservoir simulation software caused by trying to complete a well in an inactive cell. The water injector Inj is completed in both L1 and L2. It should be noted that the following model-driven (internal) event triggers were defined in the model (applicable to all scenarios tested):
a. Shut-in well ProdS if the instantaneous produced water cut (WWCT: ProdS) exceeds 98%
b. The oil target rate was set at 12,000 bopd
c. Minimum flowing bottom hole pressure was set at 1,500 psia
d. Maximum water injection rate was set at 12,500 bwpd
e. Injection well maximum bottom pressure limit of 15,000 psia Well Test Outcomes In the model, the proposed well test has been designed such that any no-flow boundaries located around the test well can be identified (i.e. to the north and to the east and west of the well). In other words the well test will help delineate the extent of any compartment containing the well. In addition, to provide a starting point for the model, three separate fully-sealing faults are defined that effectively "box in" the producer and any injector:
a. A major sealing east-west fault, traversing the whole asset, at a j-location denoted by h. The uncertainty in parameter h was assigned to be uniformly likely in the interval 12≤h≤36.
b. A pair of fully-sealing north-south faults, traversing the full extent of the asset, and located either side of the test well. These faults are located with respect to the parameter g at i positions 36−g and 54+g. The uncertainty in parameter g was assigned to be uniformly likely in the interval −6≤g≤6

Figure 5:
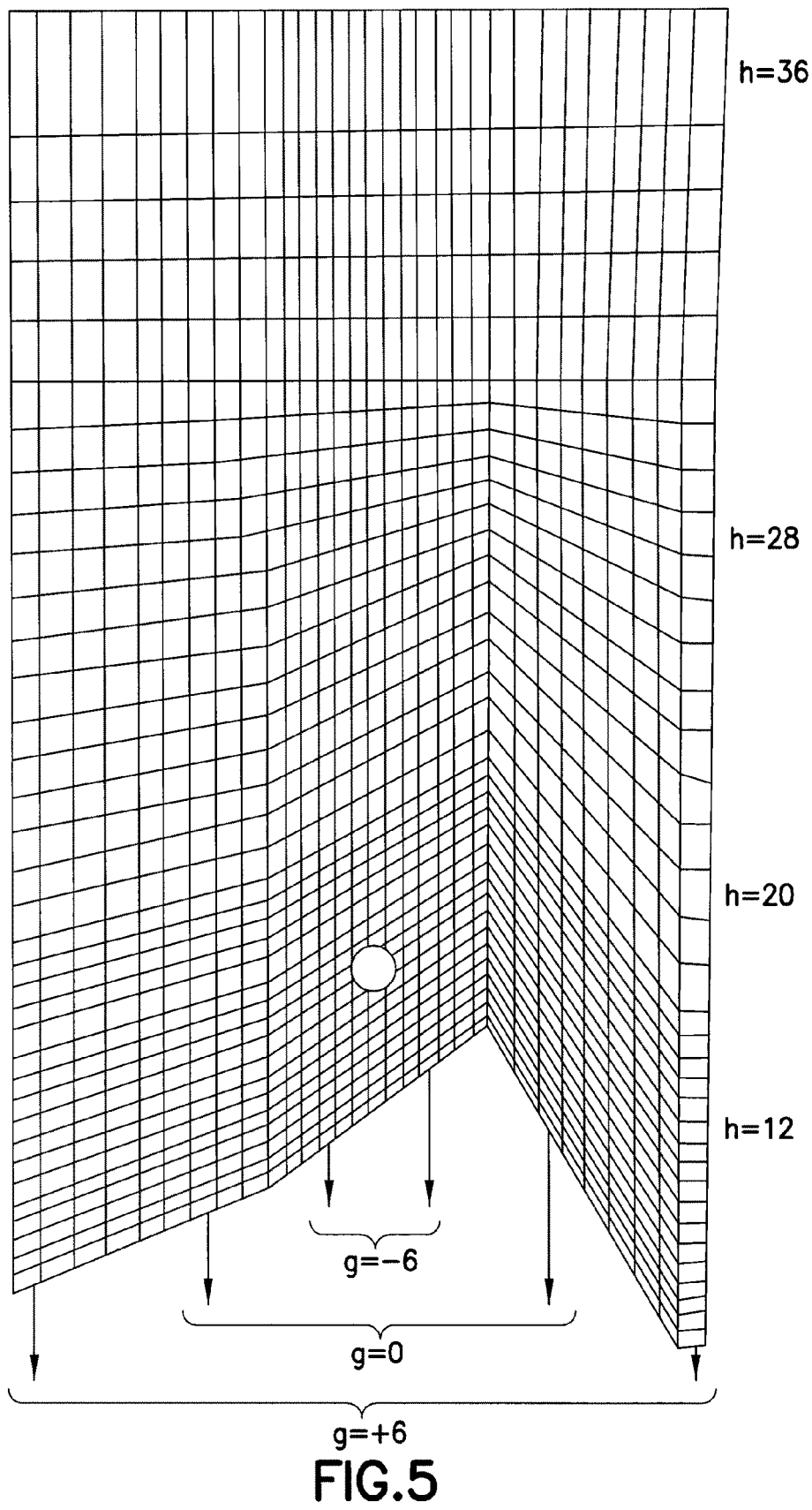
FIG. 5 shows a graphic representation of some potential locations of selected faults identified from the well test.

FIG. 5 shows potential locations of a selection of faults for a few select values of h and g. The full analysis, however, considers all possible fault locations within their respective uncertainty ranges. The three pairs of vertical lines represent north-south impermeable fault pairs at three different locations, g=−6, i=0 and +6, where the i-locations of the fault pairs are given by (36−g) and (54+g). The j-location of the east-west impermeable fault is denoted by h. The well being tested is shown by the circle.

Volume Uncertainty

The impact on STOIIP bounded by the N-S faults (g) and the E-W fault (h) is shown in Table 2 below. These values were computed using the expected values of porosity (no modification applied).

TABLE 2

| h-location | g-location | Field | L$_1$ | L$_2$ |
|---|---|---|---|---|
| 12 | −6 | 636,591 | 476,628 | 159,962 |
| | −4 | 1,113,868 | 846,283 | 284,585 |
| | −2 | 1,619,559 | 1,212,113 | 407,446 |
| | 0 | 2,338,623 | 1,752,730 | 585,892 |
| | +2 | 3,071,082 | 2,306,812 | 764,269 |
| | +4 | 3,850,533 | 2,898,248 | 952,285 |
| | +6 | 4,619,371 | 3,464,971 | 1,154,401 |
| 20 | −6 | 1,271,921 | 961,402 | 310,519 |
| | −4 | 2,259,155 | 1,706,154 | 553,001 |
| | −2 | 3,231,033 | 2,438,690 | 792,343 |
| | 0 | 4,657,043 | 3,514,516 | 1,142,527 |
| | +2 | 6,107,837 | 4,612,499 | 1,495,338 |
| | +4 | 7,659,806 | 5,788,235 | 1,871,570 |
| | +6 | 9,206,260 | 6,932,820 | 2,273,440 |
| 28 | −6 | 2,073,560 | 1,568,581 | 504,979 |
| | −4 | 3,686,496 | 2,786,436 | 900,060 |
| | −2 | 5,274,572 | 3,984,263 | 1,290,308 |
| | 0 | 7,617,330 | 5,750,213 | 1,867,117 |
| | +2 | 9,973,358 | 7,542,690 | 2,430,668 |
| | +4 | 12,491,439 | 9,459,546 | 3,031,894 |
| | +6 | 15,017,709 | 11,349,807 | 3,667,901 |
| 36 | −6 | 3,290,522 | 2,441,058 | 849,464 |
| | −4 | 5,853,812 | 4,338,050 | 1,515,762 |
| | −2 | 8,382,203 | 6,207,108 | 2,175,095 |
| | 0 | 12,105,965 | 8,957,595 | 3,148,370 |
| | +2 | 15,804,171 | 11,703,729 | 4,100,442 |
| | +4 | 19,707,897 | 14,617,408 | 5,090,489 |
| | +6 | 23,615,654 | 17,522,352 | 6,093,303 |

Wider variations in STOIIP are expected when one accounts for the uncertainty in φ. This table 2 clearly demonstrates how different values of g and h vary the recoverable STOIIP by very large amounts. Not only is the magnitude of STOIIP variation enormous, but we are also faced with uncertainty in permeability k (both vertical and horizontal), which might impact the ability to recover hydrocarbons from the asset.

Model Economics

The NPV (Net Present Value) of each development option (for all possible scenarios considered as stated above) was computed using standard discounting and accounting methods. The basis of the calculation was the results vectors from the ECLIPSE® model. These took the form of a time series with associated production rates-oil: WOPR: ProdS and water: WWPR: ProdS). Water injection rates (WWIR: Inj) were also provided for Option 2 (prodS+Inj). Table 3 below presents the example parameters used in economics model that are independent of the development option (in addition to the above a Royalty of 10% (of gross earnings) and a Tax Rate of 33% (on positive net earnings) was charged), while Table 4 shows the option-dependent economic parameters (all costs). As an example, a minimum period of 30 days of negative net earnings is necessary before the field is abandoned. For simplicity gas was completely ignored in the calculation, an assumption justified by the fact that very little gas was produced. Following the standard economic procedure a net value of V (discounted back to present) was computed. V takes into account CapEx (Capital Expenditure) and Abandonment costs stated in Table 4.

TABLE 3

| Parameter | Value |
| --- | --- |
| Oil Price | $85.00 per bbl (oil) |
| Lift Cost | $20.00 per bbl (produced oil & water) |
| Water Injection Cost | $3.00 per bbl (water injected) |
| Water Treatment Cost | $5.00 per bbl (water produced) |
| Discount Rate | 6.00 % per annum |

TABLE 4

| | Development Option | | |
| --- | --- | --- | --- |
| Parameter | Option 1: ProdS | Option 2: ProdS + Inj | Option 3: Abandon |
| CapEx | $45 million | $70 million | na |
| Fixed Costs | $2,500/day | $3,500/day | na |
| Abandonment Costs | $4.5 million | $6.5 million | $2.75 million |

Standard Decision Tree Solution

Figure 6:
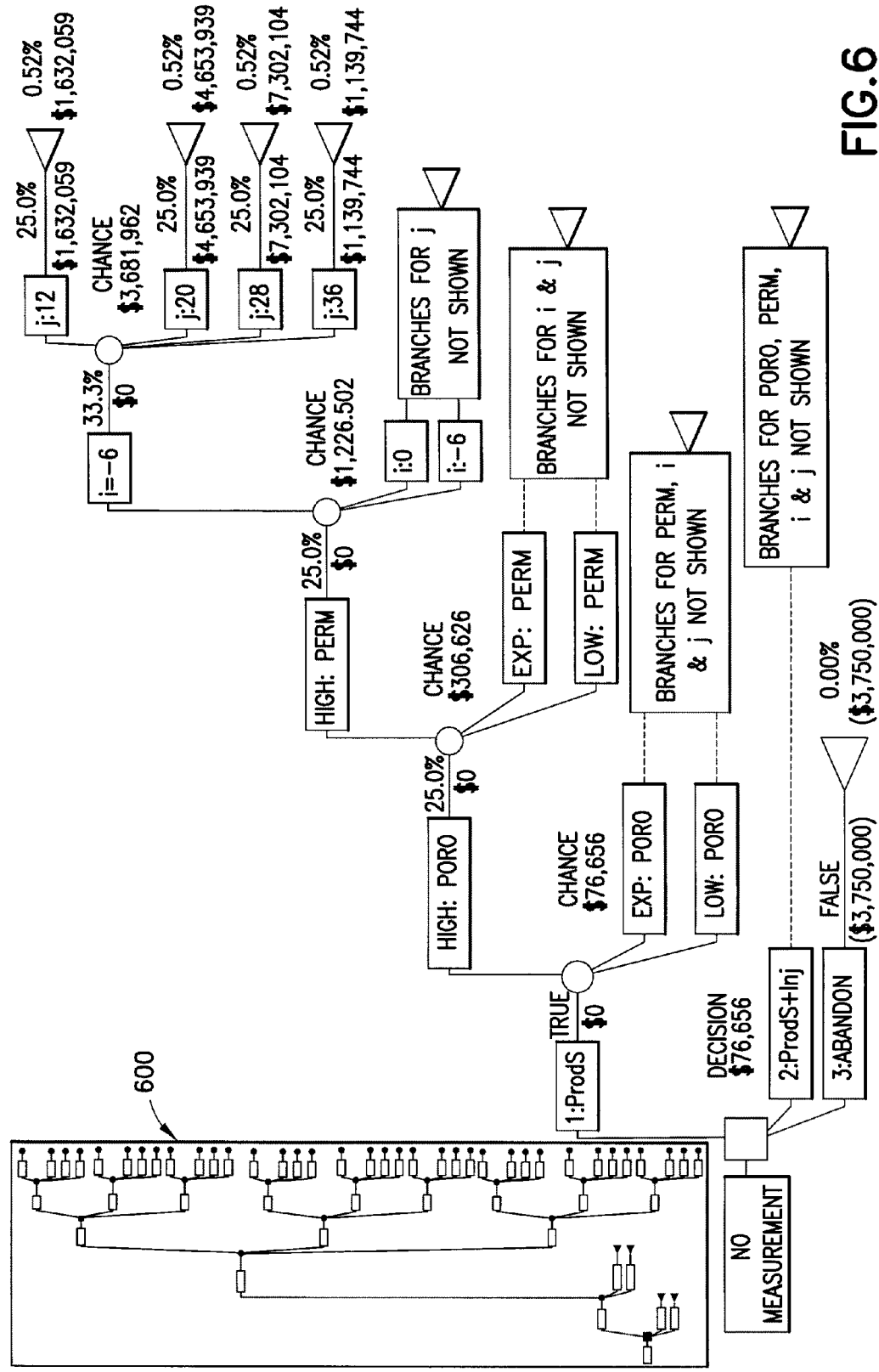
FIG. 6 shows a conventional decision tree.

FIG. 6 presents the results of a standard decision tree analysis on the problem the embodiments on the invention seek to resolve. This decision tree is expressed in terms of one or more random variables (associated with a decision node), some of which the well test will help resolve. The resolvable parameters (with some measurement uncertainty) can be the distances to the east-west and north-south faults, and the unresolvable parameters can be porosity and permeability multipliers. Other parameters like oil prices could also be added as random type series. In a further step, a reservoir model for use in valuing the asset will be constructed. For any given values of the random parameters, the reservoir model will produce oil, gas and water (with associated injection, etc). These production and injection time series are converted into cash-flows and, in one embodiment, into Net Present Values (NPVs). Then, Monte Carlo simulation can be used, possibly accelerated by polynomial chaos, to generate a table of NPVs versus the random variables. Subsequently, the value of information analysis is applied to the decision tree using these random variables in order to value the future well test. If the well-test measurement is uncertain, the report describes how to account for this as well. Finally, this value is used to determine if the well test is worth running.

It should be noted that there is no one single approach to using a stand-alone decision tree for such a problem and these are dependent upon the experience, preference and tools available to the user. In the example shown on FIG. 6, an Excel add-in called "Precision Tree®" has been used that allows one to generate a standard decision tree on a spreadsheet. Such trees typically comprise just Decision nodes (rectangular) and Chance nodes (circular) along with (triangular) termination nodes at the end of each branch. After a tree is constructed, values at each terminus node are entered and the expected monetary value is calculated at the root by backward recursion. An "optimum" path through the tree can then be traced by taking the path with the highest expected value (at each decision node).

FIG. 6 shows a simple and intentionally incomplete two-dimensional spreadsheet decision tree covering the situation outlined in FIGS. 3 and 5. This tree has a chance node for each uncertainty present (shown as filled circles). In this example problem there are four uncertainties: location of the g fault pair, location of fault h, φ and k (although these latter two parameters are somewhat correlated, it is assumed in this tree that they are not). Each of these is represented by a chance node with three discrete possible outcomes (except fault h which takes four discrete outcomes). The inset 600 in FIG. 6 shows how the number of branches rapidly grows with problem complexity for just one development scenario. Even this inset diagram is incomplete as the full extent of the branch structure is not shown due to space restrictions. It is needed to define discrete values for all of these essentially continuous random variables, but as the number of values increases, so does the number of related branches and termination nodes, greatly increasing total tree complexity. In this example the number of branches (with terminal nodes) per development scenario is (3×3×3×4)=108. This is equivalent to 216 separate terminal nodes for the two scenarios considered here (ProdS and ProdS+Inj) plus one extra node for Abandon totaling 217 terminal nodes, each with their own value of NPV. The mechanics of tree construction for this number of realizations is practically hardly workable. Alternative methods that can capture the full richness of the uncertainties present are therefore a better alternative.

It is to be noted that the following assumptions apply in the construction of the conventional decision tree for both development options:
a. Permeability multiplier k is represented in our conventional decision tree in three discrete states:
  i. kHigh=1.35 (assigned a 25% probability)
  ii. kExp.=1.00 (assigned a 50% probability)
  iii. kLow=0.75 (assigned a 25% probability).
b. Porosity multiplier if > is represented in our conventional decision tree in three discrete states:
  i. φHigh=1.10 (assigned a 25% probability)
  ii. φExp.=1.00 (assigned a 50% probability)
  iii. φLow=0.90 (assigned a 25% probability)
c. North-south fault pair g is equi-probable for one of three states (33% each): +6, 0 and −6
d. East-west fault h is equi-probable for one of four states (25% each): 12, 20, 28 and 36.

The expected NPV for each option determined through the multi-branched standard decision tree is as follows:

$$E_{k\phi gh}(V|D_P)=\$25.24\times10^6$$

$$E_{k\phi gh}(V|D_I)=\$28.47\times10^6$$

$$E_{k\phi gh}(V|D_A)=-\$2.75\times10^6.$$

Thus the rational and preferred development option is $D_I$ (ProdS+Inj) as it furnishes an expected NPV of $\$28.47\times10^6$ ($\$3.23\times10^6$ more than Dp, option ProdS).

Valuation

The expected value-of-information, EVoI, is defined as the difference between the expected values computed with and without the consideration of that information. In the following, a formulation of the valuation problem using mathematical notation is first provided. This is followed by a presentation using decision trees, with one embodiment of the invention defining a new kind of chance node that allows uncertainty to be described by a continuous probability density function (pdf). This extension allows the uncertainty in permeability and porosity to be described by its proper pdf instead of requiring that it be represented discretely by just a few cases. These continuous-pdf chance nodes are efficiently evaluated using for example polynomial chaos (See WO2009/018462 herein incorporated by reference and M. A. Tatang, W. Pan, R. G., Prinn, and G. 1. McRae. An efficient method for parametric uncertainty analysis of numerical geophysical models. *Journal of Geophysical Research*, 102(D18), 1997). In other embodiments, other sampling methods could be used like Monte-Carlo, Latin hypercube . . . .

In the mathematical exposition of the valuation problem we can begin with an valuation function V(k, φ, g, h, D), which returns a unique valuation of the asset for given values of permeability multiplier k, porosity multiplier φ, N-S fault locations g, E-W fault location h and development option D. Uncertainty in V is described in terms of conditional probabilities. For example, the expected value of V given g, h and D is given by $$E_{k\phi}(V \mid g, h, D) = \int_\Omega V(k, \phi, g, h, D)\pi(k, \phi)d\Omega, \qquad (2)$$

where Π(k, φ,) is the pdf describing the uncertainty in k and φ, and Ω is the domain of this pdf. The development options are $D_P$=ProdS, $D_I$=ProdS+Inj and $D_A$=Abandon. This integration is represented as a sum when a discrete variable is indicated and can be efficiently computed using polynomial chaos for example. Expectations over the other uniform random variables can be computed using simple averages.

EVoI without New Information

With the extended decision trees containing pdf's according to one embodiment of the invention, we can define the expected values of each of the three development options in the absence of the well test:

$$E_{k\phi gh}(V|D_P) = \$21.01 \times 10^6$$

$$E_{k\phi gh}(V|D_I) = \$25.01 \times 10^6$$

$$E_{k\phi gh}(V|D_A) = -\$2.75 \times 10^6. \qquad (3)$$

Hence, in one example embodiment, a rational decision maker would choose the development option that yields the maximum expected value:

$$E(V) = \max \begin{pmatrix} E_{k\phi gh}(V \mid D_P) \\ E_{k\phi gh}(V \mid D_I) \\ E_{k\phi gh}(V \mid D_A) \end{pmatrix} = \$25.01 \times 10^6. \qquad (4)$$

This can constitute the baseline value against which the valuation with well test information will be compared in computing EVoI.

It can be observed that there is a difference between the above value ($25.01×10⁶) and that found from the conventional decision tree approach ($28.47×10⁶)–a tangible difference of $3.36×10⁶. This difference is caused by the approximate allocation of probabilities to k and φ and the expedient (but somewhat sparse) sampling of fault indices g and h in the conventional decision tree. While the eventual development decision is the same the expected net value V is certainly different.

In more general symbolic notation, this value can be denoted by:

$$E(V) = \max_D \int_U V(U, D)\pi(U)dU, \qquad (5)$$

where D is still the decision variable, while U encapsulates all of the uncertain variables.

The conventional decision tree approach to this valuation problem was discussed above, where the complexity of tree construction was reduced by considering just a few possibilities for each random variable (and the correlation between k and φ was ignored). The method according to one embodiment of the invention allows to provide a decision tree over the full range of parameter uncertainty, as presented in FIG. 7. This is akin to the tree in FIG. 6 but with many more branches emanating from each chance node. The circles in this tree of FIG. 6 represent chance nodes that assign a probability to each of the branches emanating from them. Each of the triangular termination nodes of the tree (sometimes referred to as 'leaves') represents the right-most extent of each branch. Each termination node represents a definite, fixed (discrete) values for k, φ, g, hand D, thus allowing V(k, φ, g, h, D) to be evaluated. There are thousands of leaves in this tree. The value of the tree is computed from right to left, where the value at each chance node is determined by multiplying the values of its leaves by their respective probabilities and summing the results. This summation is the expected value at this node. Progressing from right to left, these expectations are computed until all branches have been collapsed down to the decision node represented by the green square. At this point, the decision node is evaluated by selecting the value of the branch with maximum value.

Since FIG. 6 is just a graphical representation of the simple expectations given in Eq. 4, we assert that an extension of the decision tree approach is preferable to allow decision tree construction to focus on the critical decisions, and not distracted by the mechanics and drudgery of tree construction.

Figure 7:
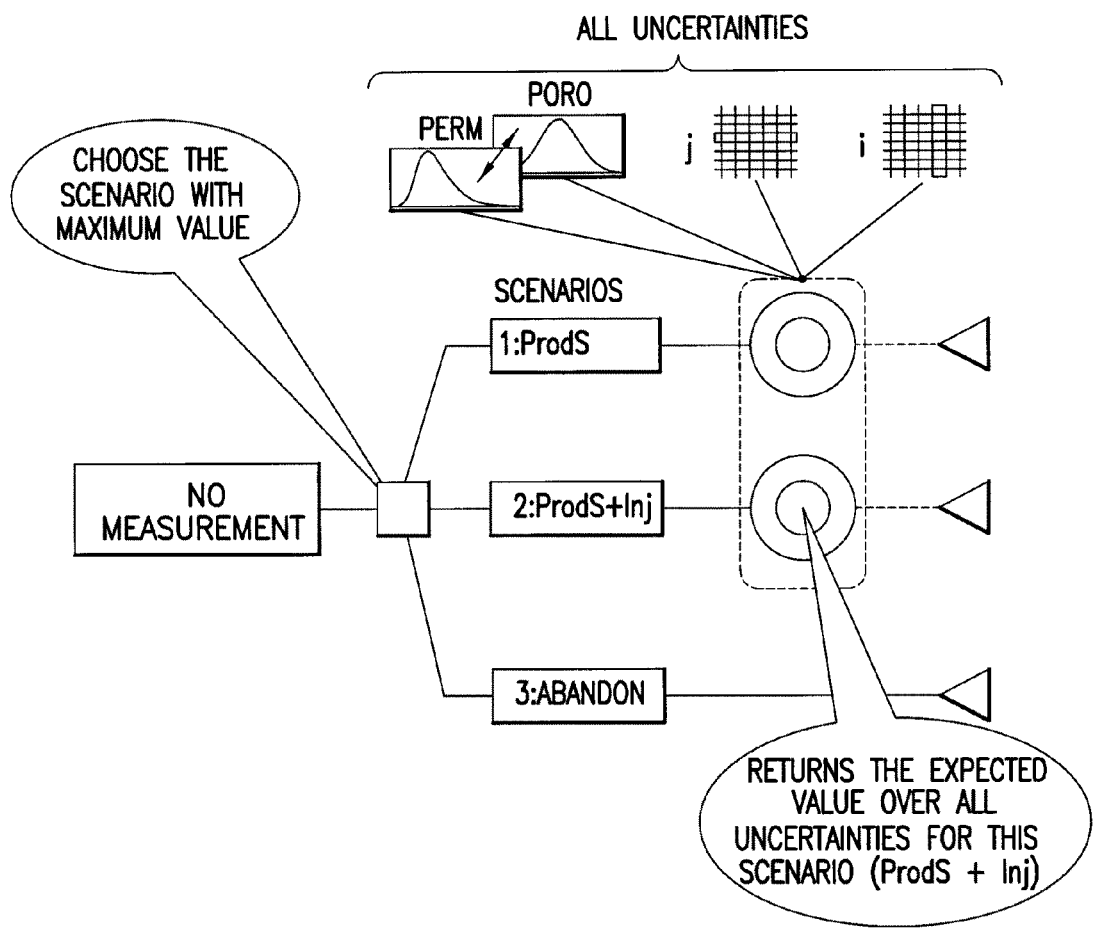
FIG. 7 shows the valuation problem for the case when no well test is run.

This simplification is illustrated in FIG. 7. Note that the multiplicity of chance nodes is now replaced by a single donut-shaped "uncertainty node" which represents the expectation overall of the variables, both continuous and discrete, that feeds into a decision. The computation of expectation in the new chance node can now be guided by practicality of estimation theory and not by the drudgery of tree assembly.

FIG. 7 shows the valuation problem for the case when no well test is run. The approach according to an embodiment of the invention is to average NPVs for all possible fault and k, phi values for a given production scenario, and then choose the scenario with maximum average value. The traditional decision tree for this problem requires hundreds of "Chance" nodes in order to represent the uncertainties in reservoir properties. The embodiment of the method of the invention presents a new tree which replaces this complex tree of chance nodes by just a single "uncertainty node" for each decision scenario. This uncertainty node takes probability distributions as inputs and makes a small number of simulations in order to return the expected NPV from these simulations as output. The consequence of using these uncertainty nodes instead of the traditional chance nodes is two fold:

the expected NPV is more accurately estimated from a continuous distribution than from user-constructed chance nodes, and the complexity of the tree is on par with the complexity of the decision problem, i.e., our new tree can be built with just a few mouse clicks instead of requiring the construction of huge decision tree.

It should be noted that the "uncertainty node" illustrated in FIG. 7 has much broader application than for this specific example involving well testing. Actually, the "chance node" in any standard decision tree can be replaced by the described uncertainty node. The advantage of the node is that it allows for software algorithm to optimally choose the appropriate sampling, and it provides a simpler and more tractable tree construct. Examples of further application could include downhole valve design problem where unknown aquifer strength significantly impacts the nature and design, and a production facility design problem in which the reservoir size and quality impact the choice of facility. Furthermore, the transformation node is useful in any decision tree incorporating measurements that are themselves uncertain.

EVoI without New Information

Figure 8:
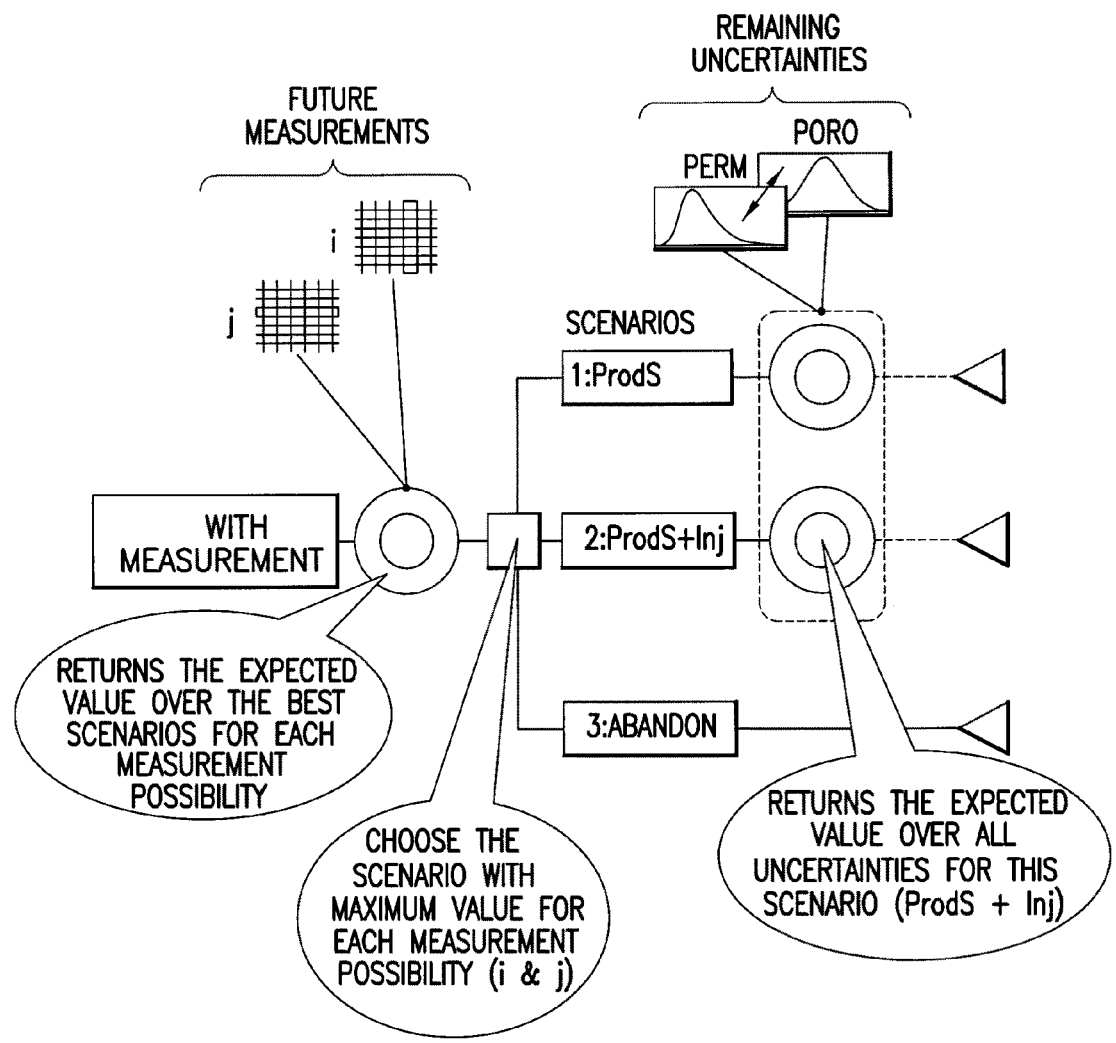
FIG. 8 shows the valuation problem for the case when a well test will be run in the future.

Computing the expected value when well-test information is used is performed in a similar fashion. Consider first the value of perfect information on the values of g and h from the well test. The decision tree for this embodiment of the invention is shown in FIG. 8. At the decision node (square) we are assuming perfect information on g and h, from which we choose the best development option based on the maximum expected value for each. These expectations are over the remaining uncertainty in k and $\phi$. A summary map of the best decision for each value of g and h is shown in FIG. 9.

Figure 9:
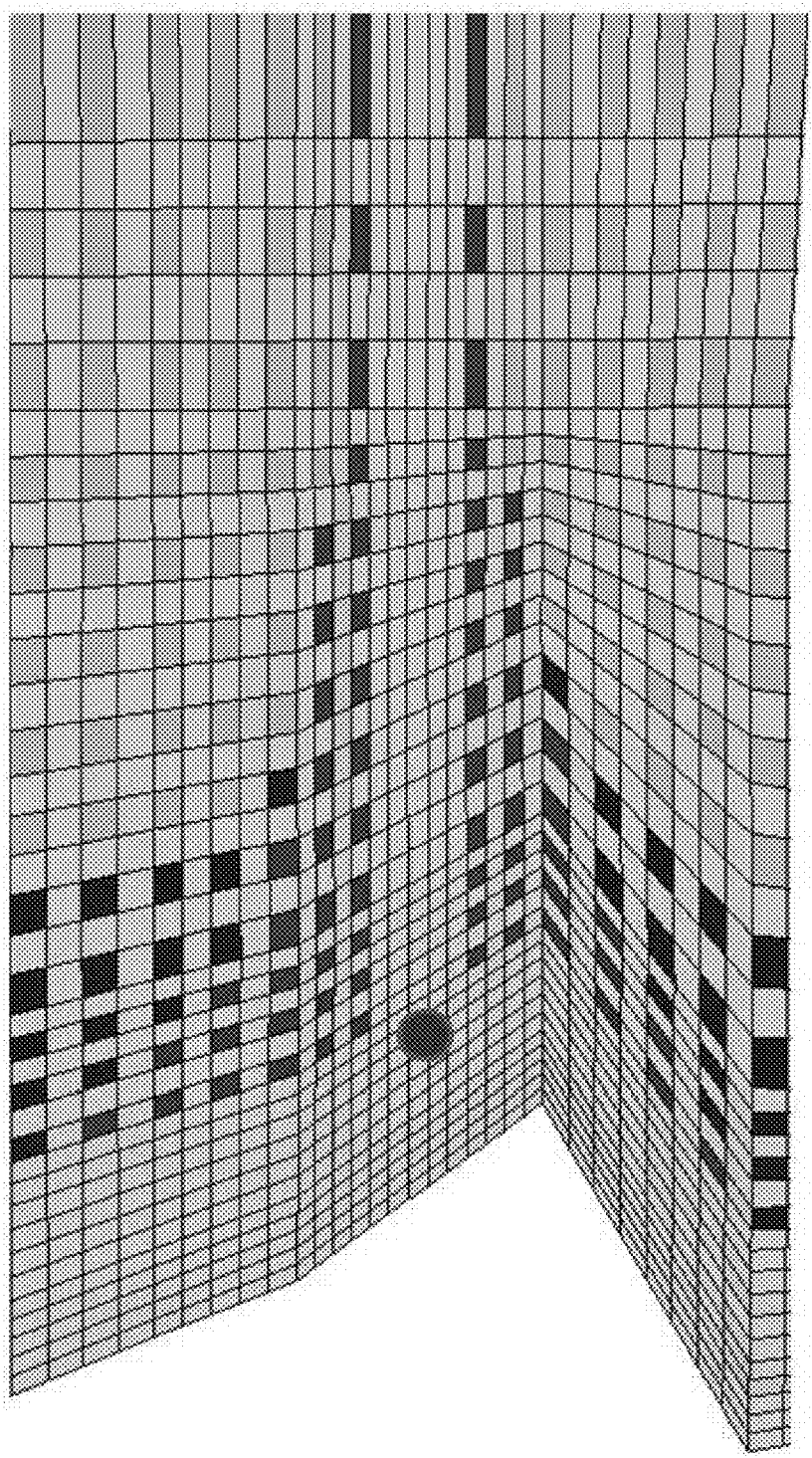
FIG. 9 is a development summary map for every other grid cell location analyzed according to the method of the invention.

FIG. 9 is a development summary map for every other grid cell location analyzed according to an embodiment of the method of the invention. Each colored square corresponds to a specific (g,h) fault configuration. The color indicates the optimum production scenario for that particular fault configuration. For example, when the faults form a tight box around the well, the best action is to abandon the well. Abandon is seen to be the best option when the field is smaller, either because of narrowness in the north-south or east-west directions. ProdS+Inj is the best option when the field is larger.

In cases when the field has broad E-W extent, but narrow in the N-S direction, the best option is ProdS, and is preferred over prodS+Inj because this configuration puts the injector too close to the producer resulting in premature and excessive water breakthrough. It can be noted that in another embodiment of the method of the invention, one could fold into the analysis an additional decision variable—namely the j-location of the water injector so as to maximize the sweep efficiency.

Returning to the decision tree of FIG. 8, since we do not know the values of g and h before the well test is performed, this decision node is fed by an uncertainty node describing an expectation over the uncertainty in g and h. By using just two layers of uncertainty nodes instead of a multiplicity of chance nodes, this decision tree represents the decision problem at the appropriate level of detail, namely at the decision level instead of at the expectation level. Its simplicity is more closely matched to its mathematical description:

$$E(V) = \int_{\Omega_g \Omega_h} \left[ \max_D \int_{\Omega_k \Omega_\phi} V(k, \phi, g, h, D) \pi(k, \phi) dk d\phi \right] \quad (6)$$

$$\pi(g, h) dg dh$$

$$= E_{gh}[\max_D E_{k\phi}(V | k, \phi, g, h, D)]$$

$$= \$42.02 \times 10^6.$$

The expected value of information, assuming that it is perfect, is found by subtracting the base case value from the expected value with perfect information, yielding:

$$EVoI = \$42.02 \times 10^6 - \$25.01 \times 10^6 = \$17.01 \times 10^6. \quad (7)$$

EVoI with Measurement Uncertainty

Next we consider the case where the well-test measurement provides an imperfect measurement of g and h. These imperfect measurement values are denoted $\hat{g}$ and $\hat{h}$. The expected valuation formula is the same as Eq. 6, but with g and h replaced by $\hat{g}$ and $\hat{h}$:

$$E(V) = E_{\hat{g}\hat{h}}[\max_D E_{k\phi}(V | k, \phi, \hat{g}, \hat{h}, D)]. \quad (8)$$

In order to relate this formula directly to Eclipse simulation output, $E_{k\phi}(V, k, \phi, \hat{g}, \hat{h}, D)$ must be expressed in terms of the simulation parameters (k, $\phi$, g, h, D). This is done using marginalization and conditional probabilities to get:

$$E_{k\phi}(V | k, \phi, \hat{g}, \hat{h}, D) = \int_{\Omega_g \Omega_h} E_{k\phi}(V | k, \phi, g, h, D) \pi(g, h | \hat{g}, \hat{h}) dg dh. \quad (9)$$

The conditional probability $\pi(g, h|\hat{g}, \hat{h})$ is used to describe the relationship between measurement values and the uncertainty in g and h. This measurement reliability measure must be specified in advance of the valuation. Substituting Eq. 9 into Eq. 8 yields:

$$E(V) = E_{\hat{g},\hat{h}} \left\{ \max_D \left[ \int_{\Omega_g \Omega_h} E_{k\phi}(V | k, \phi, g, h, D) \pi(g, h | \hat{g}, \hat{h}) dg dh \right] \right\}. \quad (10)$$

Figure 10:
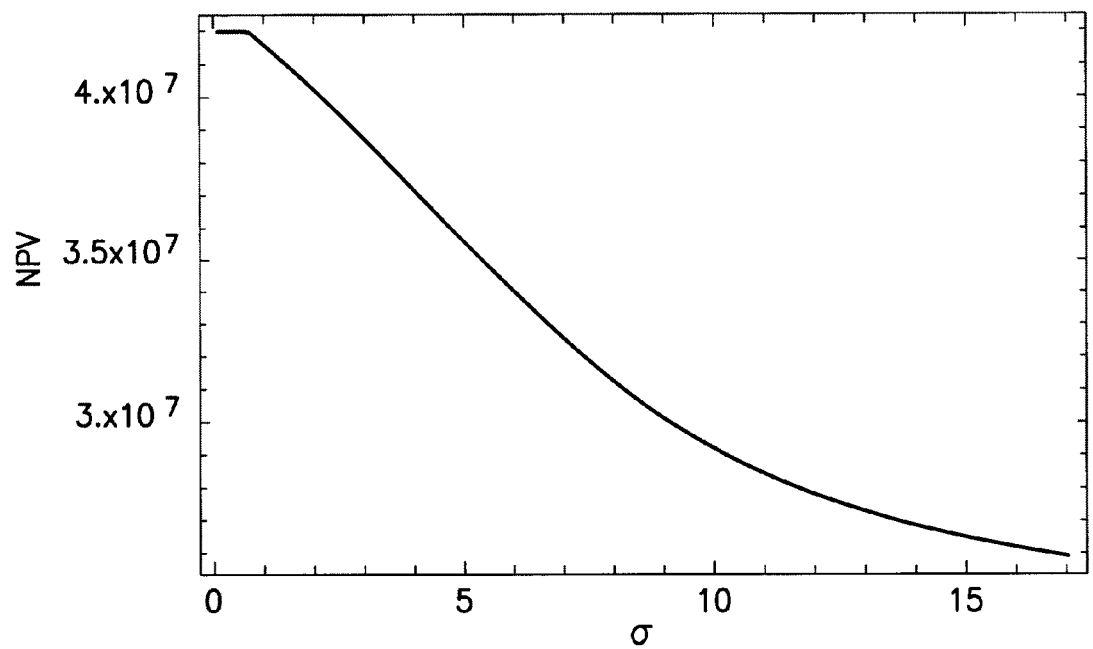
FIG. 10 shows the expected value of an asset plotted against the standard deviation of the reliability of the well-test measurements.

Taking $\pi$ (g, h|$\hat{g}$, $\hat{h}$)=$\pi$(g|$\hat{g}$) $\pi$ (h|$\hat{h}$) and $\pi$ ($\hat{g}$,$\hat{h}$)=$\pi$ (g, h), and using Gaussians for the reliability distributions $\pi$ (g|$\hat{g}$)=N($\hat{g}$, $\sigma$) and $\pi$ (h|$\hat{h}$)=N($\hat{h}$, $\sigma$) with standard deviation $\sigma$, the expected value of an imperfect well-test measurement is plotted vs. $\sigma$ in FIG. 10. This result is consistent for the end values $\sigma$=0 and $\sigma \to \infty$: for a perfect measurement ($\sigma$=0), the expected value agrees with the $\$42.02 \times 10^6$ reported above for a perfect measurement, and as $\sigma$ increases, the expected value drops down toward the expected asset value in the absence of a measurement, $\$25.01 \times 10^6$. Note that the measurement loses about half its value when the standard error on the reliability of the measurement of g and h is about six grid blocks.

We can approximately relate the uncertainty in g and h measured by the well test to its duration, t, and the distance, d, to the faults through the estimation formula for boundary location (See R. N. Hom. *Modern Well Test Analysis: A Computer-Aided Approach*. Petroway, Inc., Palo Alto, Calif., 2 edition, 1997.)

$$\sigma \propto \frac{d}{\sqrt{t}}. \quad (11)$$

The proportionality constant can be estimated by an experienced well test interpreter. For the purpose of this demonstration we use the rule σ=2 cells when d=10 cells and t=3 days. Eq. 10 is updated to reflect this change in uncertainty by replacing π (g, h|ĝ, ĥ) by:

$$\pi(g,h|\hat{g},\hat{h},\sigma_{\hat{g}}(\hat{g},t),\sigma_{\hat{h}}(\hat{h},t)). \quad (12)$$

Figure 11:
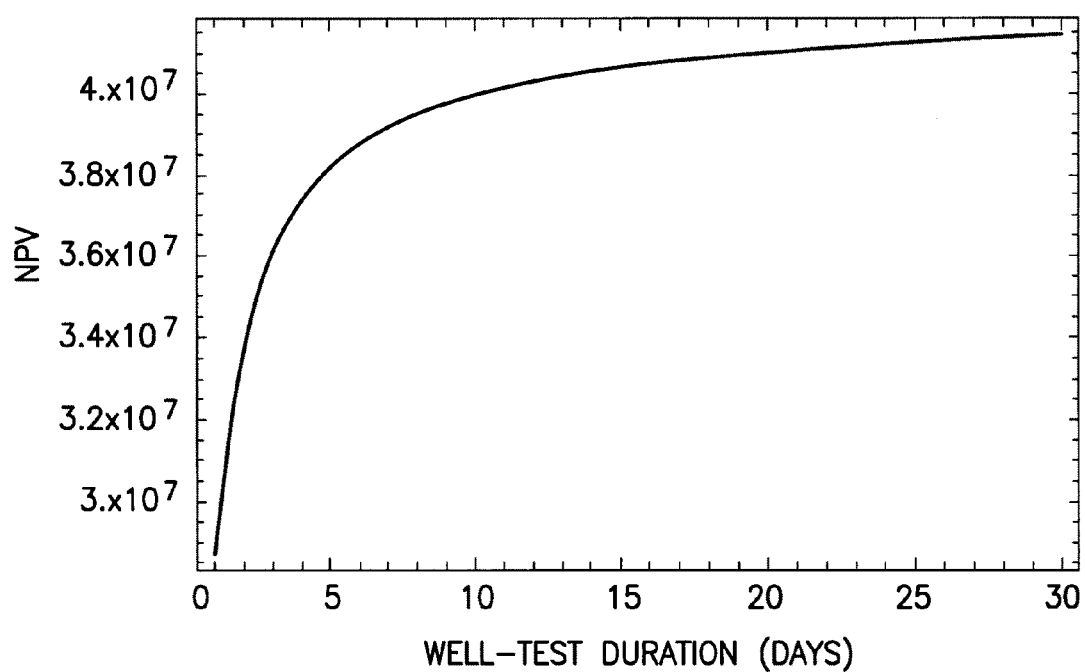
FIG. 11 expresses the results of FIG. 9 in terms of well test duration.

This transforms the results of FIG. 10 into those shown in FIG. 11. Note that about 30 days are needed to achieve the maximum expected value from the well test.

Figure 12:
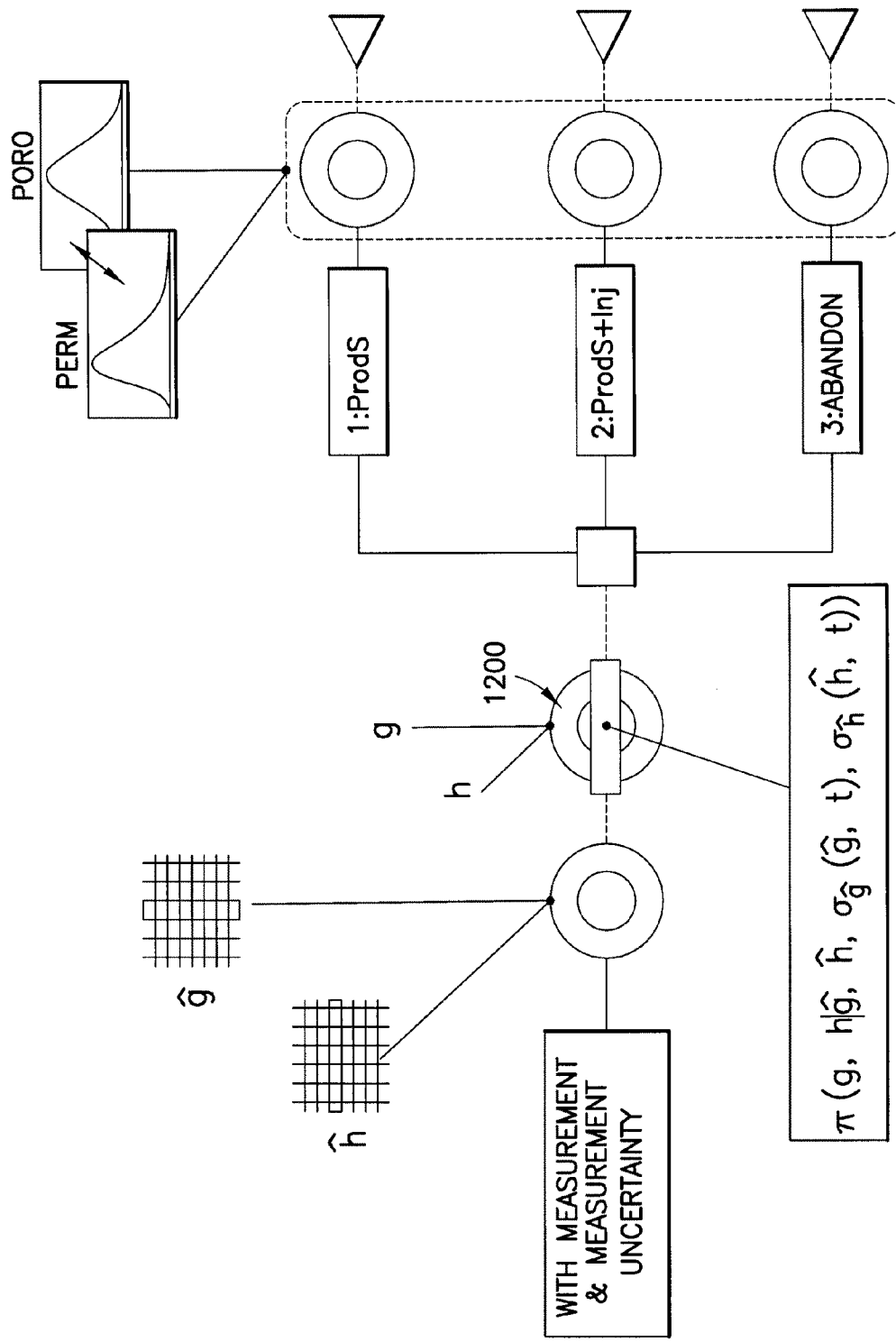
FIG. 12 shows a decision tree according to one embodiment of the invention.

We incorporate uncertain measurements into a decision tree construct using a the new "Transformation Uncertainty Node." This tree, shown in FIG. 12, presents this transformation as a donut-shaped node (1200) with a box denoting the conditional probability transformation that takes place. This node adds an extra layer to the decision tree to account for the mapping of the uncertain measurement values into distributions of the certain measurement values. If one represents this transformation using chance nodes in a standard decision tree, one would need a chance node for all possible pairs of g and h, and in turn each of these pairs would feed into another chance node over all possible pairs of g and h for this pair of g and h. This would result in an extraordinarily large tree that would be untenable to construct and populate using standard tools. Using the "Uncertainty" and "Transformation Uncertainty" nodes according to the invention, this complexity is avoided.

Figure 13:
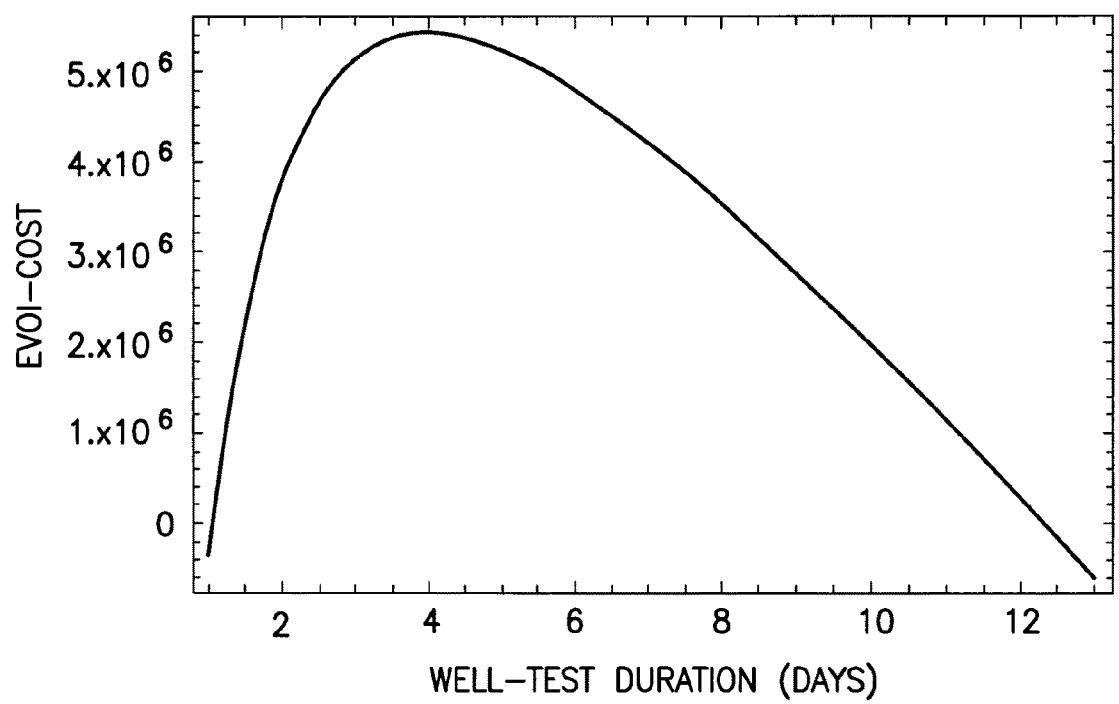
FIG. 13 the expected value of information minus the cost of a test plotted versus the test duration. The maximum of this curve indicates the optimum well-test duration.

However, the net value from a well test must account for the increasing cost of the test with time. It must also account for the expected value of information, EVoI. Subtracting an assumed well-test cost of $(3+t)×10^6 and the no-well-test value of $25.01×10^6 yields the net EVoI versus well-test duration plot shown in FIG. 13. This plot shows that the maximum expected value is achieved in approximately four days. This duration could be useful in the planning phase of a test. This graph also indicates whether a test would be expected to have any value at all for a client.

Figure 14:
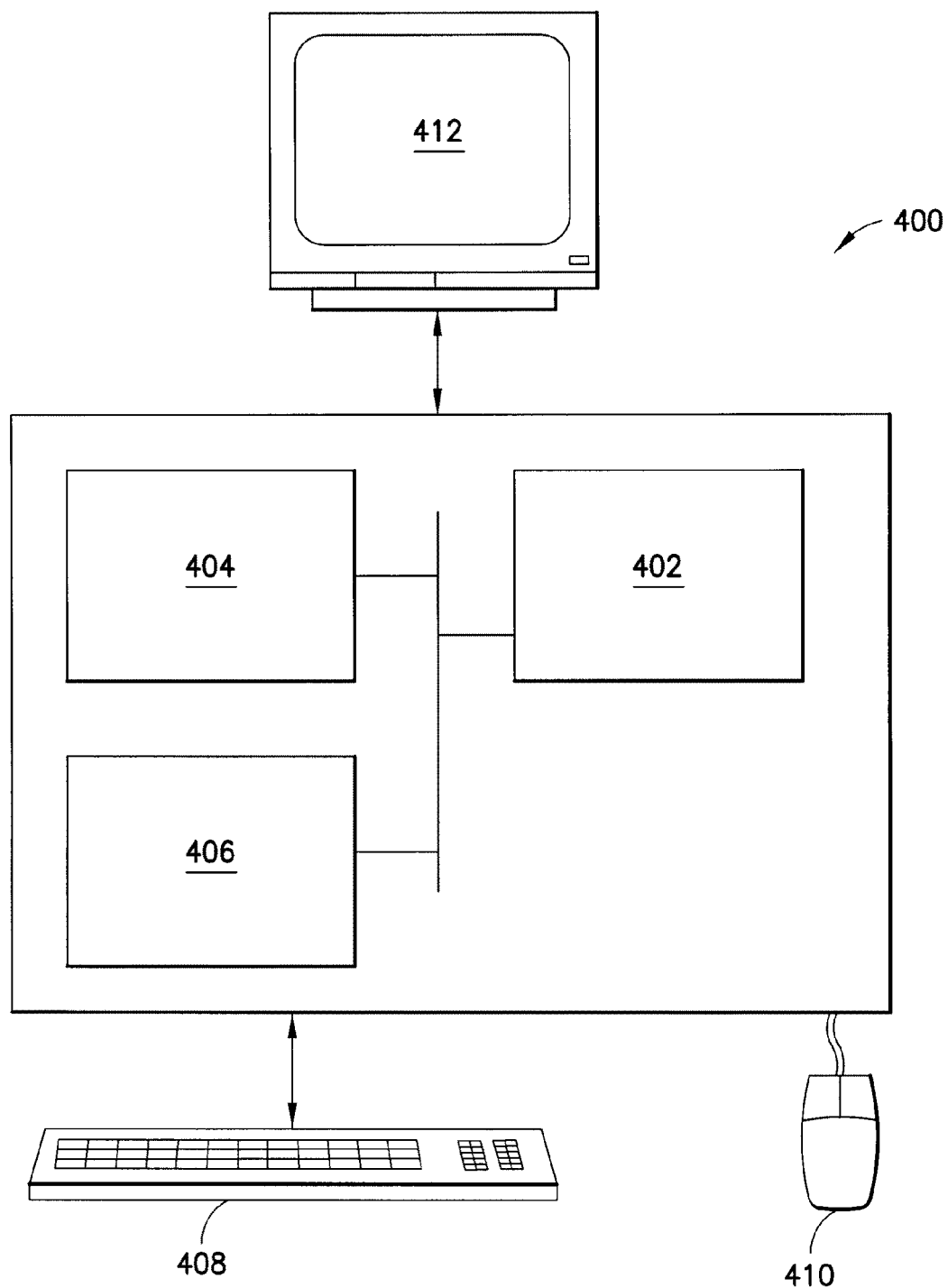
FIG. 14 shows a computer system in accordance with one or more embodiments of the invention.

The invention may be implemented on virtually any type of computer regardless of the platform being used. For example, as shown in FIG. 14, a networked computer system (400) includes a processor (402), associated memory (404), a storage device (406), and numerous other elements and functionalities typical of today's computers (not shown). The networked computer (400) may also include input means, such as a keyboard (408) and a mouse (410), and output means, such as a monitor (412). The networked computer system (400) is connected to a local area network (LAN) or a wide area network (e.g., the Internet) (not shown) via a network interface connection (not shown). Those skilled in the art will appreciate that these input and output means may take other forms, now known or later developed. Further, those skilled in the art will appreciate that one or more elements of the aforementioned computer (400) may be located at a remote location and connected to the other elements over a network.

Further, the invention may be implemented on a distributed system having a plurality of platforms, where each portion of the invention may be located on a different platform within the distributed system. In one embodiment of the invention, the platform corresponds to a computer system. Alternatively, the platform may correspond to a processor with associated physical memory. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Particularly, the use of the method according to one embodiment of the invention in selecting optimum well-test duration is one preferred example of how one could use EVOI to optimize well-test operations. Other natural extensions or further applications of this concept include optimizing the type of well test, the reservoir intervals to test and which wells to test. In addition, one can characterize the value of information by other metrics in order to include risk aversion in decision making, such as through statistical quantiles such as P10 (representing the VOI having only a 10% probability of being lower than this) and through utility functions. Accordingly, the scope of the invention should be limited only by the attached claims.

What is claimed is:

1. A method of performing an oilfield operation within an oilfield comprising:
   a. inputting in a computer system at least two possible options to perform the oilfield operation;
   b. inputting in the computer system a first variable related to the oilfield; said first variable being able to fall within a first range of values;
   c. inputting in the computer system a second variable related to the oilfield; said second variable being able to fall within a second range of values;
   d. generating with the computer system a decision tree comprising an uncertainty node for each one of the at least two possible options to perform the oilfield operation, wherein the uncertainty node is linked to an uncertainty description for at least one of the first or second variable and the uncertainty description comprises a probability density function when the first or the second variable are continuous random variables and the uncertainty description comprise discrete probabilities when the first or the second variable are discrete random variables;
   e. generating with the computer system a figure of merit for each uncertainty node;
   f. performing the oilfield operation by selecting one of the at least two possible options based on the value of their respective figure of merit.

2. A method according to claim 1, wherein the uncertainty description comprises uncertainties associated with the first or the second variable.

3. A method according to claim 1 wherein the figure of merit is evaluated by modeling the oilfield operation using at least one selected from a group consisting of reservoir simulator, wellbore simulator, surface network simulator, process simulator, hydrocarbon charge simulator and economics simulator.

4. A method according to claim 1 wherein the uncertainty description is evaluated using sampling methods.

5. A method of performing an oilfield operation within an oilfield comprising:
   a. inputting in a computer system at least two possible options to perform the oilfield operation;
   b. inputting in the computer system a first variable related to the oilfield; said first variable being able to fall within a first range of values;

c. inputting in the computer system a second variable related to the oilfield; said second variable being able to fall within a second range of values;
d. generating with the computer system a decision tree comprising an uncertainty node for each one of the at least two possible options to perform the oilfield operation, wherein the uncertainty node is linked to an uncertainty description for at least one of the first or second variable;
e. generating with the computer system a figure of merit for each uncertainty node;
f. performing the oilfield operation by selecting one of the at least two possible options based on the value of their respective figure of merit;
g. inputting in the computer system a specific range of values for the first variable, said specific range of values being included within the first range of values;
h. generating with the computer system an additional uncertainty node for the specific range of values;
i. generating with the computer system an additional figure of merit for the additional uncertainty node; and
j. inputting the value of the additional figure of merit in the decision tree.

6. A method according to claim 5 further comprising generating a transformation node for the decision tree, wherein the transformation node represents the uncertainty linked to the first specific range of values.

7. A method of determining an optimum well test duration for a subsurface reservoir formation having at least one wellbore, the method comprising:
assessing the accuracy of the well test as a function of well test duration;
quantifying a value-of-information of the well test while accounting for uncertainties associated with the wellbore and/or subsurface reservoir and/or measurements performed within the wellbore and/or interpretation of the measurements;
estimating a well test cost as a function of the well test duration; and
determining the optimum well test duration by combining the accuracy of the well test, the value-of-information and the well test cost to determine the time at which maximum marginal value-of-information from the test is achieved.

8. A method of optimizing a well-test operation for a subsurface reservoir formation having at least one wellbore, the method comprising:
computing value-of-information of a well test while accounting for uncertainties associated with reservoir parameters and/or uncertainties associated with the measurement values and/or uncertainties associated with market variables by
a. inputting in a computer system at least two possible options to perform an oilfield operation;
b. inputting in the computer system a first variable related to the subsurface reservoir formation; said first variable being able to fall within a first range of values;
c. inputting in the computer system a second variable related to the subsurface reservoir formation; said second variable being able to fall within a second range of values;
d. generating with the computer system a decision tree comprising an uncertainty node for each one of the at least two possible options to perform the oilfield operation, wherein the uncertainty node is linked to an uncertainty description for at least one of the first or second variable and the uncertainty description comprises a probability density function when the first or the second variable are continuous random variables and the uncertainty description comprise discrete probabilities when the first or the second variable are discrete random variables;
e. generating with the computer system a figure of merit for each uncertainty node; and
optimizing the well test operation from the computed value-of-information of the well test.

9. A method of optimizing well-test operations according to claim 8, further comprising accounting for risk preference of a decision maker.

* * * * *